United States Patent
Kreang-Arekul et al.

(10) Patent No.: US 7,127,090 B2
(45) Date of Patent: Oct. 24, 2006

(54) METHODS AND SYSTEMS FOR COMBINING A PLURALITY OF RADIOGRAPHIC IMAGES

(75) Inventors: Somchai Kreang-Arekul, San Mateo, CA (US); Arkady Gliner, San Francisco, CA (US); Leon Kaufman, San Francisco, CA (US)

(73) Assignee: Accuimage Diagnostics Corp, So. San Francisco, CA (US)

( * ) Notice: Subject to any disclaimer, the term of this patent is extended or adjusted under 35 U.S.C. 154(b) by 675 days.

(21) Appl. No.: 10/005,473

(22) Filed: Nov. 6, 2001

(65) Prior Publication Data

US 2003/0026469 A1    Feb. 6, 2003

Related U.S. Application Data

(60) Provisional application No. 60/308,997, filed on Jul. 30, 2001.

(51) Int. Cl.
*G06K 9/00* (2006.01)
*G06K 9/36* (2006.01)
*G06K 9/32* (2006.01)

(52) U.S. Cl. .............. 382/128; 382/132; 382/284; 382/294

(58) Field of Classification Search .......... 382/128, 382/132, 178, 175, 282, 287, 289, 294, 274, 382/284, 296; 128/922; 375/4
See application file for complete search history.

(56) References Cited

U.S. PATENT DOCUMENTS

| | | | |
|---|---|---|---|
| 5,111,045 A | 5/1992 | Konno et al. | |
| 5,130,541 A | 7/1992 | Kawai | |
| 5,325,293 A | 6/1994 | Dorne | |
| 5,528,492 A | 6/1996 | Fukushima | |
| 5,549,117 A | 8/1996 | Tacklind et al. | |
| 5,570,404 A | 10/1996 | Liang et al. | |
| 5,640,200 A * | 6/1997 | Michael | 348/87 |
| 5,687,306 A | 11/1997 | Blank | |
| 5,986,279 A | 11/1999 | Dawaele | |
| 6,049,622 A | 4/2000 | Robb et al. | |
| 6,083,162 A | 7/2000 | Vining | |
| 6,097,418 A | 8/2000 | Larsen et al. | |
| 6,102,938 A * | 8/2000 | Evans et al. | 623/1.35 |
| 6,195,471 B1 | 2/2001 | Larsen | |
| 6,268,611 B1 * | 7/2001 | Pettersson et al. | 250/559.3 |
| 6,273,606 B1 | 8/2001 | Dewaele et al. | |
| 6,363,163 B1 * | 3/2002 | Xu et al. | 382/130 |
| 6,563,943 B1 * | 5/2003 | Sasada | 382/132 |
| 6,605,042 B1 * | 8/2003 | Dong et al. | 600/447 |
| 6,714,680 B1 * | 3/2004 | Sasada | 382/216 |
| 6,744,931 B1 * | 6/2004 | Komiya et al. | 382/284 |
| 6,750,873 B1 * | 6/2004 | Bernardini et al. | 345/582 |
| 2001/0007593 A1 * | 7/2001 | Oosawa | 382/132 |
| 2002/0008697 A1 * | 1/2002 | Deering | 345/418 |

(Continued)

OTHER PUBLICATIONS

Product Brochure by Agfa, "ADC Full Leg/Full Spine Software, High accuracy automated Full leg/Full spine image assembly with ADC".

*Primary Examiner*—Duy M. Dang
(74) *Attorney, Agent, or Firm*—Townsend and Townsend and Crew LLP

(57) ABSTRACT

Methods and systems for combining a plurality of radiographic images. Software can be used to provide various stitching and blending methods to join first and second images into a composite, larger image.

46 Claims, 16 Drawing Sheets

U.S. PATENT DOCUMENTS

| | | |
|---|---|---|
| 2002/0012004 A1* | 1/2002 | Deering ................... 345/589 |
| 2002/0114536 A1* | 8/2002 | Xiong et al. ............. 382/284 |
| 2002/0168091 A1* | 11/2002 | Trajkovic ................ 382/107 |
| 2003/0053136 A1* | 3/2003 | Chang ..................... 358/3.06 |
| 2003/0063383 A1* | 4/2003 | Costales .................. 359/464 |
| 2003/0179923 A1* | 9/2003 | Xiong et al. ............. 382/154 |
| 2003/0206179 A1* | 11/2003 | Deering ................... 345/589 |
| 2003/0209662 A1* | 11/2003 | Nelson et al. ........... 250/252.1 |
| 2003/0209672 A1* | 11/2003 | Nelson et al. ............ 250/394 |
| 2004/0008810 A1* | 1/2004 | Nelson et al. ............. 378/19 |
| 2004/0263790 A1* | 12/2004 | VanOverloop et al. ....... 353/31 |
| 2005/0129299 A1* | 6/2005 | Kreang-Arekul et al. ... 382/132 |

* cited by examiner

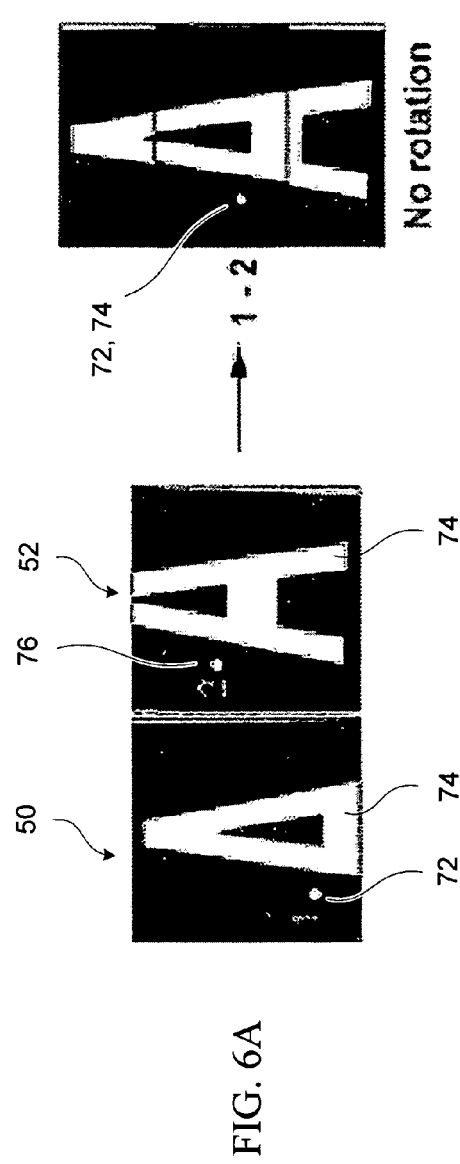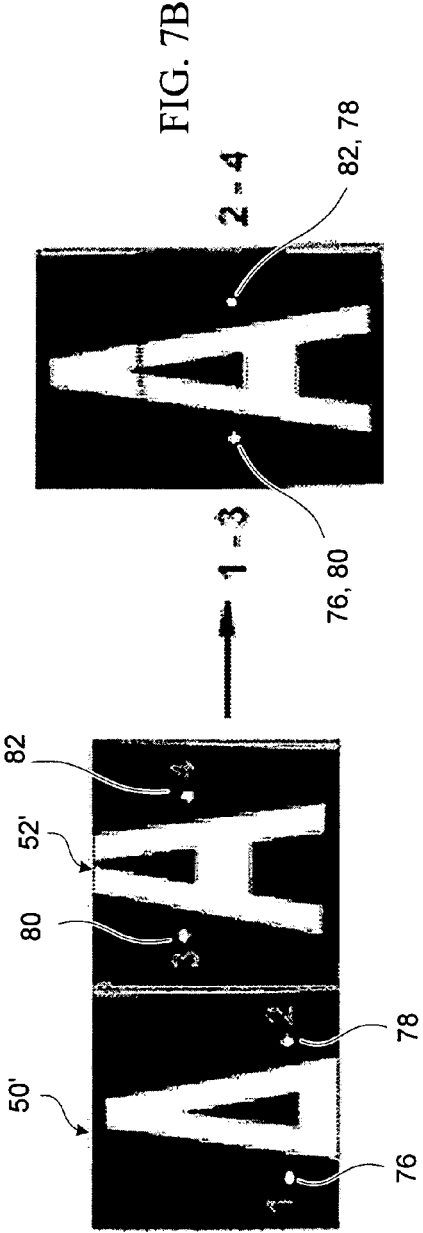
FIG. 6A  FIG. 6B
FIG. 7A  FIG. 7B

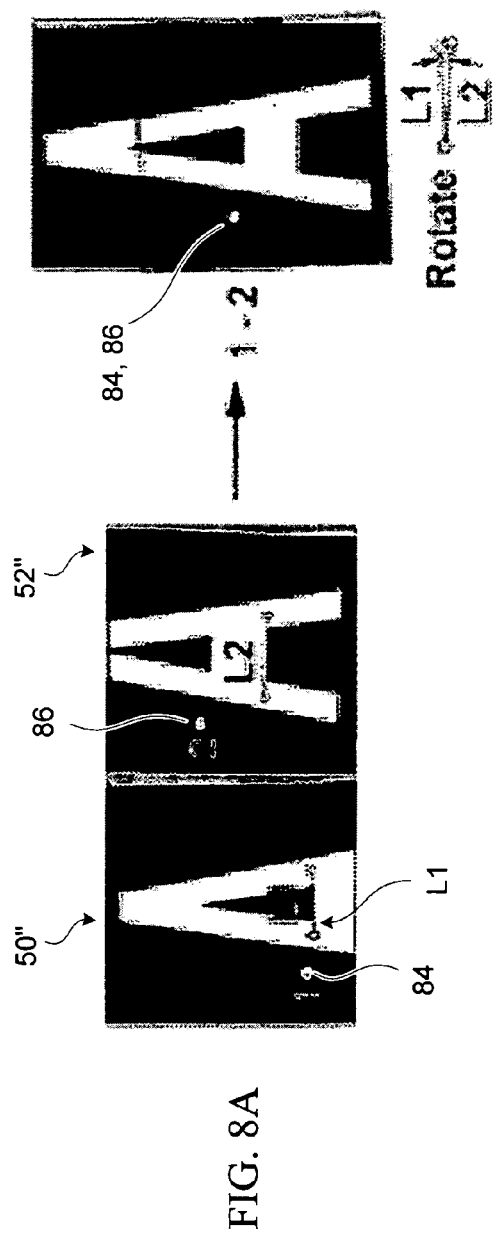
FIG. 8A
FIG. 8B
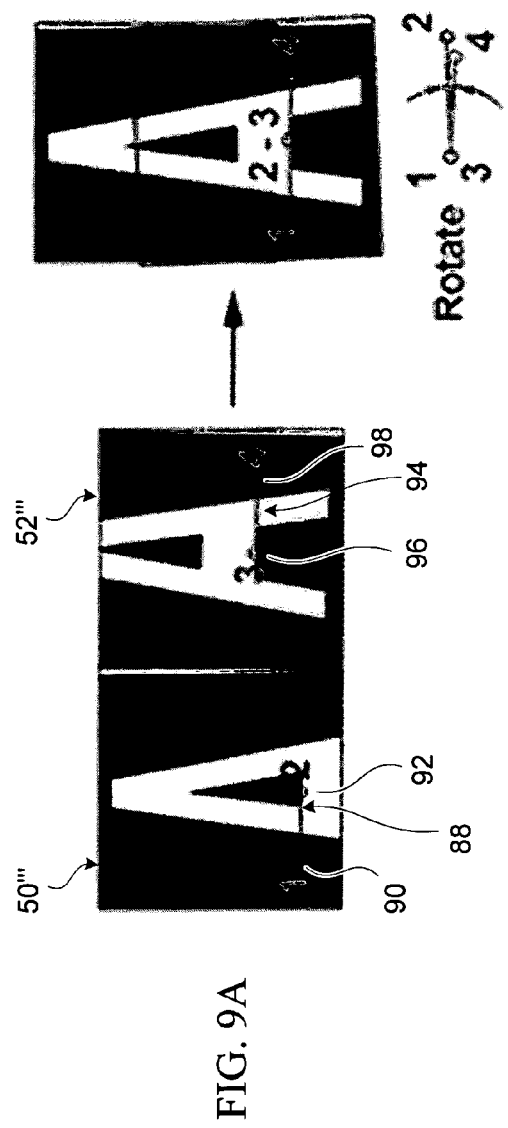
FIG. 9A
FIG. 9B

METHODS AND SYSTEMS FOR COMBINING A PLURALITY OF RADIOGRAPHIC IMAGES

CROSS-REFERENCES TO RELATED APPLICATIONS

The present application claims benefit of U.S. Provisional Patent Application Ser. No. 60/308,997, filed Jul. 30, 2001, entitled "Methods and Systems for Combining a Plurality of Radiographic Images," the complete disclosure of which is incorporated herein by reference.

The present invention is also related to U.S. patent application Ser. No. 09/908,466, filed Jul. 17, 2001, the complete disclosure of which is incorporated herein by reference.

BACKGROUND OF THE INVENTION

In the medical imaging field, oftentimes the field of view of the imaging devices is smaller than the anatomy being examined. Consequently, two or more individual images need to be obtained and then properly assembled to form the appropriate field of view for analysis. Such assembly of the images is referred to hereinafter as "stitching."

The need for stitching is encountered in many digital radiography, MRI, ultrasound, and nuclear medicine evaluations, all techniques that are capable of imaging along the axis of possible motion. Unfortunately, stitching of the images is not always straightforward. Because it is not always known how much the patient or the imaging device has moved or how much the patient shifts or rotates between image shots, accurate stitching of the individual images often proves difficult. Thus, flexibility of the stitching the images is desirable.

One particular use in which stitching is often used is in a scoliosis evaluation. Scoliosis is defined as a substantial lateral curvature of the vertebral column that usually has its onset during periods of rapid growth. Scoliosis curve is determined to be present when a structural vertebral column curve of 11° or more is measured in the coronal plane roentgenogram of the erect patient. Radiologic imaging of the spine has traditionally been used in the identification, classification, and monitoring of scoliosis. Early detection and bracing treatment of juvenile and adolescent idiopathic scoliosis has decreased the need for surgery.

In scoliosis evaluations it is often necessary to stitch the radiographic image of the thoracic and upper lumbar spine with the radiographic image of the lumbar and lower thoracic spine to provide a large enough field of view to allow the physician to measure the angle of scoliosis or the "Cobb angle." Unfortunately, conventional "stitching" methods of drawing and measuring directly on the radiographic film have been found to be inaccurate, and sometimes introducing errors of ±5°–10°, or more.

Such large alignment errors can affect the perceived alignment of the anatomy and dramatically affect the choice of treatment of the patient. For example, when the angle of scoliosis is mild (0°–20°), the recommended treatment is observation and careful follow-up. For moderate scoliosis (20°–40°), bracing is recommended, while severe scoliosis (greater than 50°) surgical fusion of the spine is recommended. Thus, the physicians' evaluation and the choice of treatment is highly dependent on the evaluation of the stitched image. Unfortunately, because the conventional stitching methods can introduce deviations of ±10° or more, the measured angle of scoliosis from the stitched image would likely not accurately indicate to the physician how severe a case of scoliosis was present in the patient.

Accordingly, what are needed are methods, software, and systems that provide an accurate means for stitching images. It would also be desirable to provide a highly versatile set of choices that can increase the ease of stitching. It would further be desirable to provide improved quality of the stitched image, especially in the overlap section of the stitched images.

BRIEF SUMMARY OF THE INVENTION

The present invention provides methods, software, and computer systems for stitching radiographic images to form a single, larger field of view radiographic image.

In one aspect, the present invention provides an improved digital stitched image. The stitched images of the present invention include a first image and a second image. The first image and second image are marked and overlapped so that the markers on the first image and the second image are matched together. Because the images are overlapped, a portion of the first image and second image are superposed. To improve visualization—and to improve the physicians' ability to accurately diagnose the patient—the overlapped section of the stitched image can be blended. Proper blending allows for an easier understanding of the anatomy and of the features that may have been introduced by motion of the patient between shots.

Each of the digital images of the present invention is composed of a plurality of pixels. The pixel intensity for the pixels in the first image and the second image are calculated. The pixel intensity of the superposed pixels of the first image and second image are compared to each other and some function of the pixel intensity of the first image and second image can be generated to create the pixels in the blended overlap section.

For example, in one embodiment, each pixel of the first image in the overlap section and each of the corresponding superposed pixels in the second section are calculated, and the larger of the two measured pixel intensities is displayed. Alternatively, the smaller of the two measured pixel intensities is displayed. In yet other embodiments, an average of the measured pixel intensities is displayed.

In yet further embodiments, a smooth transition from the first image to the second image can be created. In exemplary embodiments, the transition or overlap section includes a first end, a middle point, and a second end. The first end can have 100% of the pixel intensity of the first image and 0% of the pixel intensity of the second image. The middle point can have 50% of the pixel intensity of the first image and 50% of the pixel intensity of the second image. The second end can have 0% of the pixel intensity of the first image and 100% of the pixel intensity of the second image. Between these points, the weights can vary linearly or by some other non-linear weighting relationship. Such an overlap section should provide an unnoticeable, smooth transition between the first image and the second image.

In another aspect, the present invention provides methods of aligning a plurality of images. The methods include the steps of providing a marker on a first image and a second image and overlapping the first image and the second image to match the marker on the first image with the marker on the second image. An absolute difference value is computed between the pixel intensities of the overlapping portions of the first and second images to validate alignment between the first and second images.

Advantageously, the methods of the present invention provide direct visual feedback in real time regarding the registration between the images in the overlap section. The absolute difference will display how well the pixels of the overlapped images correlate. If there is an exact match, the entire overlap section will be black and the user will know that there was a registration. More likely however, there will be some differences in the images, due to patient movement or the like, between the images. If the images are not correctly aligned, the user can rotate or translate at least one of the images—observing and minimizing the differences in the overlap section—until the images are accurately aligned in the area of interest, or over the anatomic feature of interest, even if this is not possible over the whole region of overlap.

After the first and second images are registered, any of the blending methods of the present invention can be used to blend the overlap section of the stitched image.

In another aspect, the present invention provides methods of stitching and blending at least a first and second image. In exemplary embodiments, the methods of the present invention provide a blending that improves the visualization of the stitched image in an overlap or transition zone between the first and second images. The methods include the step of marking the first and second image with a marker. Typically, the marker will be placed over a rigid anatomic marker that is viewable in both the first and second images. A portion of the first radiographic image and a portion of a second radiographic image can be overlapped so as to match up the markers on the first and second images. To improve visualization of the composite image, the overlap section can be blended.

The radiographic images of the present invention are composed of pixels having a pixel intensity that reflects the imaged anatomy. When a first and second image are overlapped, the present invention can measure the pixel intensity of the first and second images and use the pixel intensity measurements to create and display a blended overlap section.

The present invention provides software and methods which allow the user to choose which type of blending method is used to blend the overlap section of the first and second image. Allowing the user to select the method of blending provides the user the flexibility to select the type of blending that best meets the imaging needs for that particular image dataset. The blended overlap section can be created in a variety of ways. Some methods of creating the blended overlap section include, but are not limited to maximum intensity projection (MIP), minimum intensity projection (MinIP), average, smooth transition, and the like. Depending on the desired effect on the image, in exemplary embodiments the user will be given a choice as to which blending method is used. For example, if the user wants to highlight high density objects, the user can select a maximum intensity projection. If the user wants to minimize some undesirable high intensity artifacts introduced by the imaging device, the user can select the minimum intensity projection. For instance, notice FIG. 24, because of edge artifacts in the original images, the Maximum IP preserves these and they can be seen as thin wedges in the central portion of the stitched image. In contrast as shown in FIG. 25, the Minimum IP does not show these wedges, but notice that some rib structures (which are not important in this case) are lost along with the artifacts. An operator needs both capabilities so as to be able to choose which better fits the clinical problem at hand. If the user desires to be aware of relative motion of the subject the user can select an average, which then would show blurring where there was motion. If the user desires a smooth transition between the first and second image, the user can select a blending method which is a weighted average, in which the weighting changing as a function of position.

In another aspect, the present invention provides a method of stitching a first image and a second image. The methods include providing a first image and a second image. A portion of the first image is overlapped with a portion of the second image. The pixel intensities of the first image and second image are calculated validating alignment of the first image with the second image by displaying an absolute difference between the pixel intensities of the first image and the second image in the overlap section. In such methods, the user can visually determine, in real-time, if the first and second images are correctly aligned.

In yet another aspect, the present invention provides methods of stitching a first and a second image. In exemplary embodiments, the methods allow the user to choose the types of markers that are used to mark the images. Typically, the user will be given the choice of how many and/or the type of markers are used to mark and align the first and second images. The markers include, but are not limited to, a single point marker, two point marker, a line, and a line and a point marker. The present invention moves the images so as to match the points as closely as possible, introducing both displacement and rotation to achieve this.

Because anatomic landmarks are variable, having only one type of marker available to mark and align the images may not be sufficient to accurately stitch images together. A plurality of markers, some of which are suited to different conditions better than others, provides the user flexibility to handle the different anatomic landmarks that may be visible in the radiographic images.

In an exemplary embodiment, the present invention marks two points on each image. The present invention allows movement of the images so as to match at least two of the points. At least one of the images can be rotated with respect to the other so that the two points in each image match. Such a method is commonly used for its simplicity.

In another embodiment, the present invention marks one point on each image. The present invention moves the images so as to match the points and keeps the orientation of the images fixed. The present invention marks one point on each image when it is known that rotation has not occurred, this is a simplification of marking two points on each image to avoid operator-introduced rotation.

In another embodiment, the present invention marks one point and a line on each image. The present invention matches the points and rotates one image about that point so the lines will be parallel. Such a method is useful when one point in the image is easily identified, and a long feature (such as a steel brace) is present providing a long region that is easily identified.

In another embodiment, the present invention marks a line on each image. The present invention will match the last point of the first line to the first point of the second line and rotate the images to make the lines parallel. This method is useful when a feature such as a brace or a particular bone is seen partially in one image and partially on the other, with just a minimum of overlap.

In yet another aspect, the present invention provides methods for scoliosis analysis. In particular, the present invention provides graphical tools that can calculate and display the angle of scoliosis (e.g., the Cobb angle), also with real-time graphical feedback. Applicants have found that the methods of the present invention introduce at most only a 1° error into the evaluation of the Cobb angle. Thus, unlike conventional stitching methods, the physician will be able to accurately determine if the patient has a mild, moderate, or a severe case of scoliosis.

In exemplary embodiments, such stitching can allow for evaluating and measuring scoliosis, which involves the computerized stitching of a radiographic image of the thoracic and upper lumbar spine with a radiographic image of the lumbar and lower thoracic spine. While the remaining discussion focuses primarily on the stitching of radiographic images for use in scoliosis evaluation, it should be appreciated by those of ordinary skill in the art that the present invention can be used to stitch radiographic images for a variety of other medical and non-medical purposes. Such purposes include, but are not limited to MRI, the stitching of coronal or sagittal images obtained in separate sequences, such as those acquired to evaluate the spine or the vasculature, in CT for stitching of coronal or sagittal images reconstructed from axial projections, in cases where because of scanner limitations more than one set has to be acquired to cover the desired length along the long axis of the body, and in non-medical applications such as aerial and panoramic photography.

These and other aspects of the invention will further evident from the attached drawings and description of the present invention.

BRIEF DESCRIPTION OF THE DRAWINGS

FIG. 6A shows a first image having a first marker and a second image having a second marker;

FIG. 6B shows a composite image in which the first marker of the first image is matched up with the second marker of the second image;

FIG. 7A illustrates a first image having a first and second point marker and a second image having a third and fourth point marker;

FIG. 7B illustrates a composite image in which the first and third points and second and fourth points have been matched up, respectively;

FIG. 8A illustrates a first image having a first point marker and a first line and a second image having a second point marker and a second line;

FIG. 8B illustrates a composite image in which the first and second point are superposed over each other and the first and second images are rotated until the first and second line are in a parallel configuration;

FIG. 9A illustrates a first image having a first line and a second image having a second line;

FIG. 9B illustrates a composite image in which a first end of the first line is aligned with a first end of the second line, and one of the images of FIG. 7A is rotated until the lines are parallel;

DETAILED DESCRIPTION OF THE INVENTION

The present invention provides improved methods, systems, software and graphical user interfaces for allowing a user to stitch and/or blend a plurality of DICOM digital radiographic images together.

Figure 1:
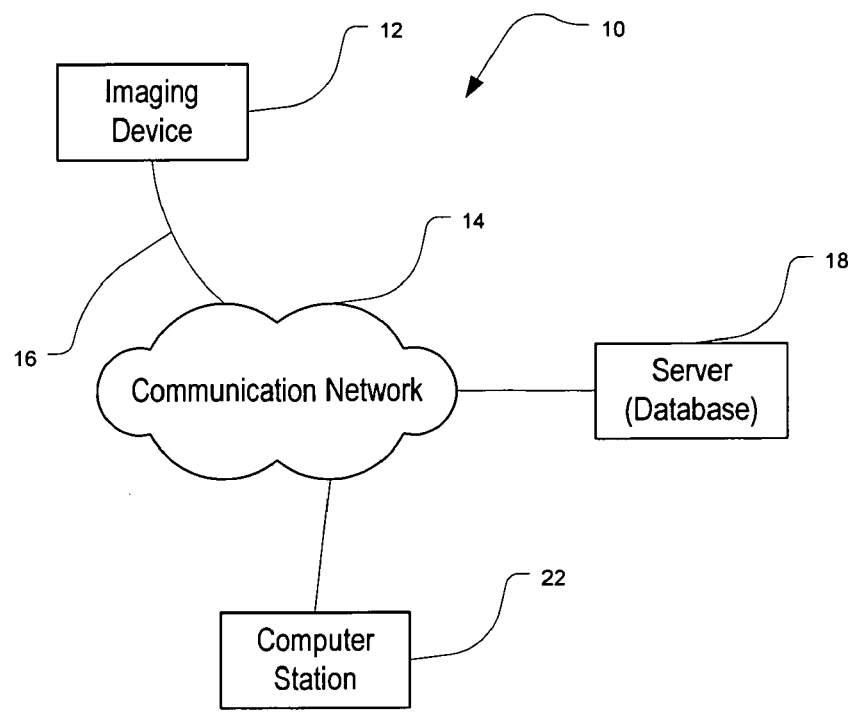
FIG. 1 is a simplified block diagram of a system incorporating the present invention.

FIG. 1 is a simplified block diagram of a system 10 which may incorporate the present invention. As shown, system 10 comprises an imaging device 12, such as an x-ray, MRI, CT, ultrasound, nuclear imaging device, or the like that is coupled to a communication network 14 (such as an intranet, LAN, WAN, or the internet) via communication link(s) 16. System 10 depicted in FIG. 1 includes a computer system 22 that communicates with the imaging device that can run software for manipulating images obtained from imaging device 16. It should be appreciated however, that system 10 depicted in FIG. 1 is merely illustrative of an embodiment incorporating the present invention and does not limit the scope of the present invention. For example, instead of delivering the image data to computer system 22 via a communication network, the images can be delivered to the computer software via a computer readable medium, such as a floppy disk, CD-ROM, or the like. Alternatively, images obtained from the imaging device can be stored on a separate server or database 18 that is coupled to computer system 22 via communication network 14.

Communication network 14 provides a mechanism allowing the various components of computer network 14 to communicate and exchange information with each other. Communication network itself may be comprised of many interconnected computer systems and communication links. Communication links 16 may be hardwired links, optical links, wireless links, or other conventional communication links.

Figure 2:
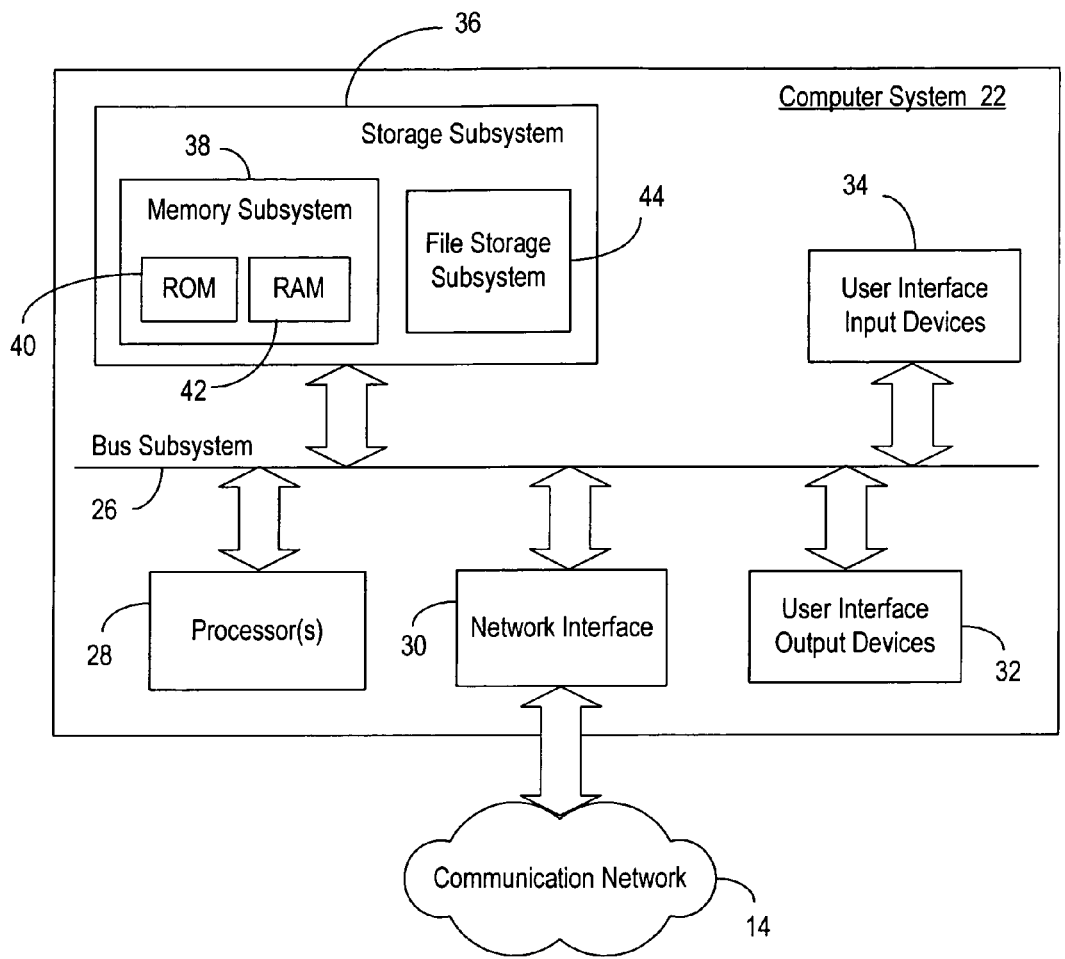
FIG. 2 is a simplified block diagram of an exemplary computer system that can run the software of the present invention.

FIG. 2 is a simplified block diagram of an exemplary computer system 22 that can run the software of the present invention. Computer system 22 typically includes at least one processor 28 which communicates with a number of peripheral devices via a bus subsystem 26. These peripheral devices may include a storage subsystem 36, comprising a memory subsystem 38 and a file storage subsystem 44, user interface input devices 34, user interface output devices 32, and a network interface subsystem 30. Network interface subsystem 30 provides an interface to outside networks, including an interface to communication network 20, and is coupled via communication network 46 to corresponding interface devices in other computer systems.

User interface input devices 34 may include a keyboard, pointing devices such as a mouse, trackball, touch pad, or graphics tablet, a scanner, foot pedals, a joystick, a touch-screen incorporated into the output device 32, audio input devices such as voice recognition systems, microphones, and other types of input devices. In general, use of the term "input device" is intended to include a variety of conventional and proprietary devices and ways to input information into computer system 24 or onto computer network 46.

User interface output devices 32 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include a variety of devices and ways to output information from computer system 24 to an operator or to another machine or computer system.

Storage subsystem 36 stores the basic programming and data constructs that provide the functionality of the various embodiments of the present invention. For example, database and modules implementing the functionality of the present invention may be stored in storage subsystem 36. These software modules are generally executed by processor 28. In a distributed environment, the software modules may be stored on a plurality of computer systems and executed by processors of the plurality of computer systems. Storage subsystem 36 typically comprises memory subsystem 38 and file storage subsystem 44.

Memory subsystem 38 typically includes a number of memories including a main random access memory (RAM) 42 for storage of instructions and data during program execution and a read only memory (ROM) 40 in which fixed instructions are stored. File storage subsystem 44 provides persistent (non-volatile) storage for program and data files, and may include a hard disk drive, a floppy disk drive along with associated removable media, a Compact Digital Read Only Memory (CD-ROM) drive, an optical drive, or removable media cartridges. One or more of the drives may be located at remote locations on other connected computers at other sites coupled to communication network 20. The databases and modules implementing the functionality of the present invention may also be stored by file storage subsystem 44.

Bus subsystem 26 provides a mechanism for letting the various components and subsystems of computer system 22 communicate with each other as intended. The various subsystems and components of computer system 22 need not be at the same physical location but may be distributed at various locations within distributed network 10. Although bus subsystem 26 is shown schematically as a single bus, alternate embodiments of the bus subsystem may utilize multiple busses.

Computer system 22 itself can be of varying types including a personal computer, a portable computer, a workstation, a computer terminal, a network computer, a module in the imaging unit, a mainframe, or any other data processing system. Due to the ever-changing nature of computers and networks, the description of computer system 24 depicted in FIG. 2 is intended only as a specific example for purposes of illustrating the preferred embodiment of the present invention. Many other configurations of computer system 24 are possible having more or less components than the computer system depicted in FIG. 2.

Figure 3A:
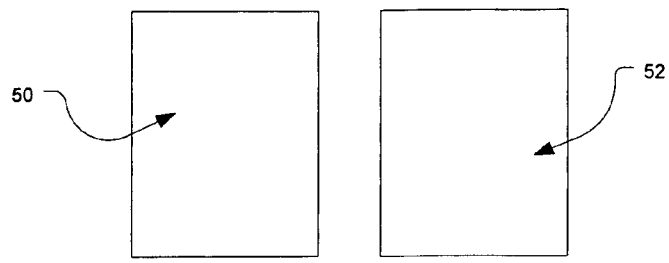
FIGS. 3A to 3D illustrate a simplified method of the present invention.
Figure 3B:
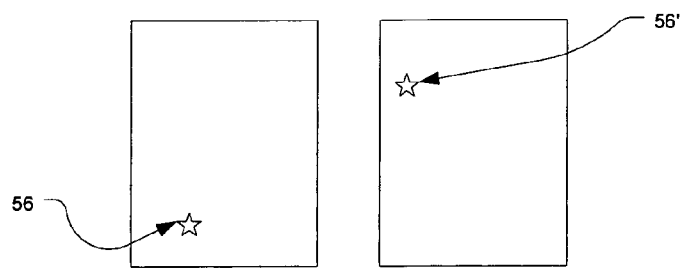

FIGS. 3A to 3D illustrate a simplified stitching method that can be performed on the systems 10 of the present invention. As shown in FIGS. 3A and 3B, at least a first image 50 and second image 52 can be stitched together to form a single, composite image 54 (FIG. 3D) that provides a larger field of view for visualization and analysis by an examining physician. In order to accurately perform an analysis on target areas of the body that cannot be properly viewed on a single radiographic image, the physician must stitch the two images 50, 52 together. As shown in FIGS. 3A and 3B, the target images can be marked with a marker 56, 56' at substantially the same anatomic landmark in the patient's body. Typically, the user will place marker 56 over a rigid landmark, such as any metal screws, stents, brace, vertebral bodies, joints, or the like.

Oftentimes, because the subject or imaging device will have moved or rotated during imaging, the first and second images may be taken from different angles and it may be difficult to accurately match the two images. Thus, as will be described in detail below, certain marking techniques may be more beneficial than other methods of marking in stitching the two or more images together.

Figure 3C:
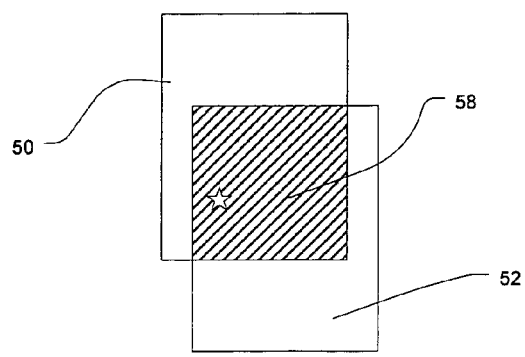
Figure 3D:
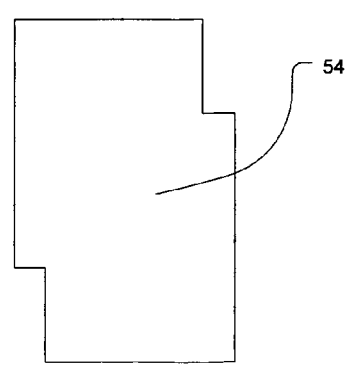

As shown in FIG. 3C, after the images are marked, markers 56, 56' on the first image 50 and second image 52 can be matched together automatically with the software. In some embodiments, the images can be translated and superposed without any rotation. In other embodiments, however, the images can be translated and rotated so that the markers can be accurately aligned. As shown in FIG. 3C, when the markers on the first and second images are superposed over each other, a portion of the first image and a portion of the second image will also be superposed over each other. Such sections are hereinafter referred to as an "overlap section 58." In exemplary embodiments, the present invention provides methods of blending the overlap section 58 so as to provide improved visualization of the composite stitched image. Once the overlap section 58 is blended the final stitched image 54 can be analyzed by the examining physician.

Figure 4:
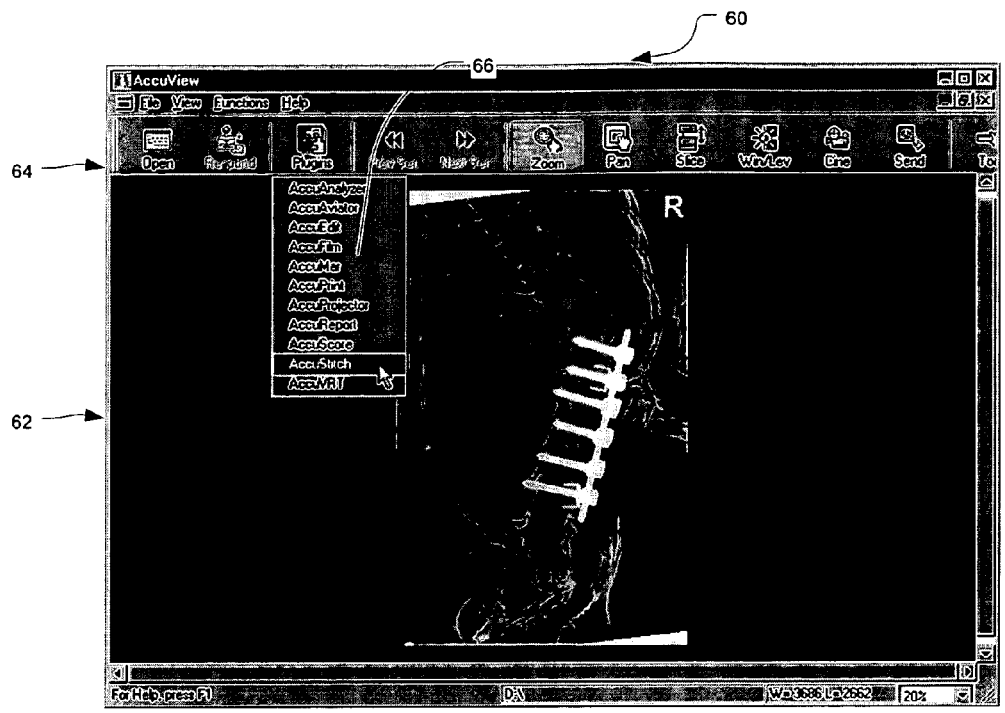
FIG. 4 a graphical user interface of the present invention displaying a single image and a tool palette.

Referring now to FIG. 4, the present invention further provides a graphical user interface 60 that can be displayed on output device 32 of the computer system 22 of the present invention (FIG. 2). The graphical user interface 60 of the present invention has an image window 62 and a tool palette 64 for allowing user input to manipulate the images. As illustrated by the pull-down menu 66, the stitching functionality (shown herein as "AccuStitch") provided by the present invention can be a software module of an imaging software program, or alternatively the stitching functionality can be a stand alone software program. Another exemplary graphical user interface that can incorporate the present invention is described in U.S. patent application Ser. No. 09/908,466, filed Jul. 17, 2001, the complete disclosure of which is incorporated herein by reference.

Figure 5:
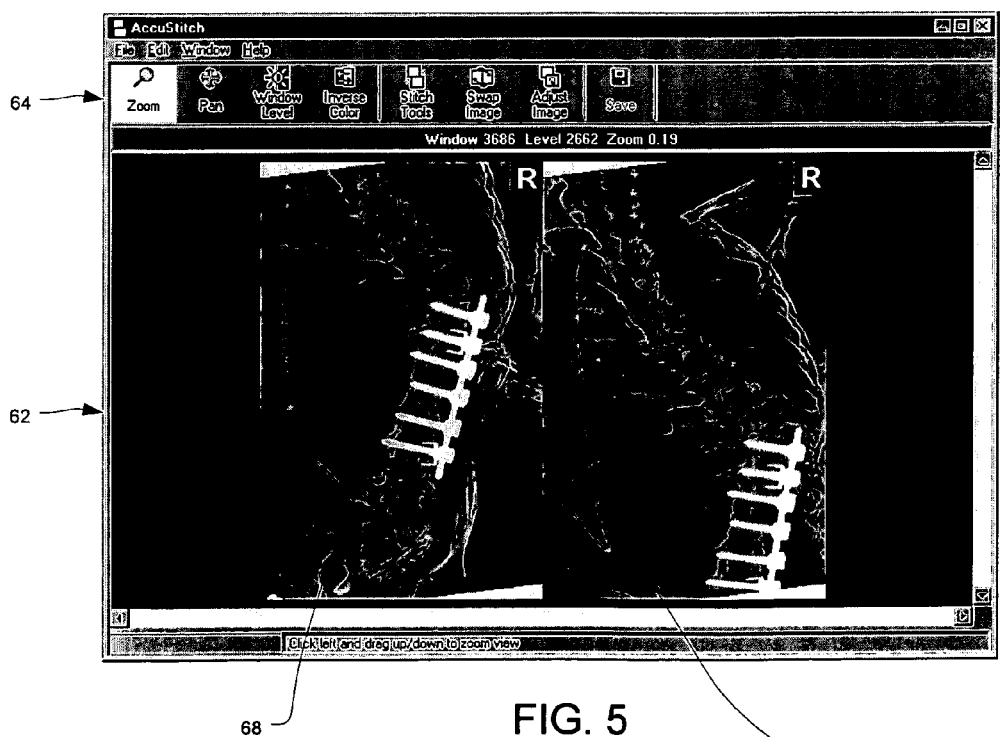
FIG. 5 illustrates a graphical user interface showing a first image and a second image that are to be stitched.

When the user desires to stitch a plurality of images together, the user can download the desired images into the software, either via communication network 14 or from memory 36, and display the images in the image window 62 of graphical user interface 60. As shown in FIG. 5, first image 68 and second image 70 are typically displayed adjacent to one another in image window 62. Typically, first image 68 and second image 70 are taken from the same imaging unit and have the same dimensionality and gray scale. If desired, the user can manipulate the zoom factor of the images, translate the images, switch the images, rotate the images, or the like, using tool palette 64. After images 68, 70 are displayed in image window 62, the user can place at least one marker/fiducial on each of the images over the same anatomic landmark(s), blend the overlap section of the image, and the like.

In exemplary embodiments, the present invention can allow the user to choose what type of marker or fiducial can be placed on the images to mark and align the images. Applicants have found that providing a plurality of marking methods gives the user the ability to accurately align the images, no matter what type of anatomic conditions are present in the image dataset. In some situations, it may be desirable to use a single point to align the images. In other instances, however, it may be required to use a plurality of markers (e.g., two points, a point and a line, etc.) on each image to correct any rotation or movement of the patient during the imaging. Some exemplary marking methods are discussed herein below.

As shown in FIG. 6A, if it is known that the patient has been held rigid and the imaging device is held rigid such that there is no rotation of the target tissue when the images are obtained, a single point will be the easiest and fastest method of aligning the first and second images. As shown in FIG. 6A, a first marker 72 can be placed over/adjacent a landmark 74 in first image 50, and a second marker 76 can be placed over/adjacent landmark 74' in second image 52. After the images 50, 52 have been marked, the markers can be superposed over each other so as to align images 50, 52 (FIG. 6B). When only one marker is used to mark the images, typically the first and second images will not be rotated so as to prevent the introduction of mis-registration of the images. It should be appreciated however, that in alternative embodiments, it may be possible to rotate at least one of the images to properly align the first image 50 with the second image.

Due to patient breathing and/or shifting during the imaging, oftentimes there will be some misalignment between the first image and the subsequent images taken due to movement of the patient during imaging. Thus, a single point marker may not be sufficient to accurately align and stitch the images together. FIG. 7A shows a first image 50' and a second image 52' in which the user places a first and second marker 76, 78 on the first image 50' and a third and fourth marker 80, 82 on the second image 52'. To stitch the first and second image, the user can manually align or the computer software can be programmed to automatically align the first marker 76 with the third marker 80 and the second marker 78 with the fourth marker 82 (FIG. 7B). Similar to the method of FIG. 6A, the markers are typically positioned an adjacent anatomic landmark that is visible in both the first image 50' and second image 52'.

In placing two markers on each image the operator may inadvertently introduce a small placement error, so that the distance between the markers in the first image is not equal to the distance between the markers in the second image. In that case, the software splits the difference, and further allows for small manual adjustments for further refining the position of the markers.

FIG. 8A shows a first marker 84 and a first line L1 on a first image 50" and a second marker 86 and a second line L2 on a second image 52". In such a marking method, the user will place first marker 84 and second marker 86 substantially over the same anatomic landmark in the first and second image. First line L1 and second line L2 can be positioned in the first and second image. To align and stitch the first and second images, as shown in FIG. 8B, the user or computer software can superpose the first marker 84 over the second marker 86, or vice-versa. Thereafter, at least one of the images 50", 52" can be rotated until lines L1 and L2 are parallel. The image will typically be rotated about points 84, 86 until the lines L1, L2 are parallel.

FIG. 9A illustrates a method of aligning a first image 50''' with a second image 52''' through use of lines. A first line 88 having a first point 90 and a second point 92 is drawn on the first image. A corresponding second line 94 having a third point 96 and a fourth point 98 can be drawn in a contiguous anatomic position in the second image. The software aligns point one 90 and point three 96 (or points two and four if desired) and rotate the first line 88 or second line 94 about the first point/second point so that the lines are superposed over each other. The stitched image is shown in FIG. 9B.

Figure 10A:
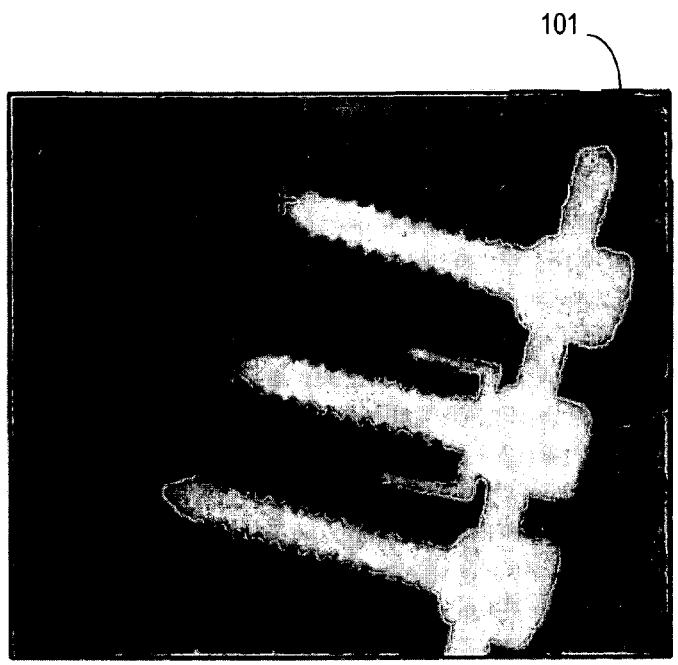
FIGS. 10A and 10B illustrate a method of marking the images using a cursor and mouse.
Figure 10B:
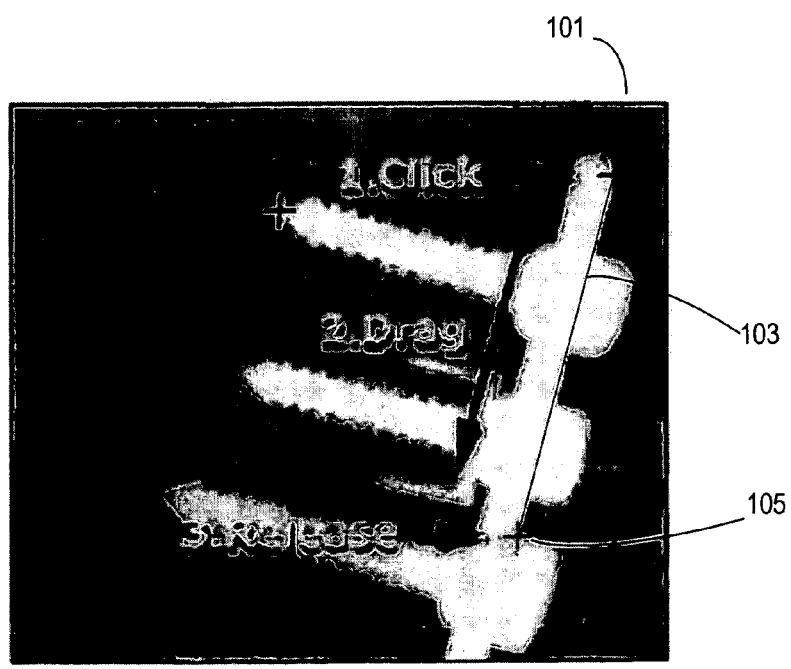

The point markers and lines can be placed on the images using a variety of conventional and proprietary methods. For example, in one exemplary method, a user can click on a button of a mouse while placing a cursor 101 over a target portion of the image (FIG. 10A). To draw a line 103, the user need only left click on a mouse button at a point of the image to start the line and drag the cursor 101 to an ending point 105 of the line and release the mouse button (FIG. 10B). It should be appreciated however, that other input devices, such as the keyboard, joystick, or the like can be used to draw the points and lines.

Providing a plurality of marker types allows the user to align radiographic images that may not be accurately aligned if only one type of marker is provided. Such flexibility of marking the images improves the visualization of the target body area, and consequently provides the examining physician an opportunity to accurately examine the images.

The present invention marks one point on each image when it is known that rotation has not occurred, this is a simplification of marking two points on each image to avoid operator-introduced rotation.

In another embodiment, the present invention marks two points on each image. The present invention moves the images so as to match the points and rotates one image with respect to the other so that the two points in each image are match. Such a method is commonly used for its simplicity.

In another embodiment, the present invention marks one point and a line on each image. The present invention matches the points and rotates the image about that point so the lines will be parallel. Such a method is useful when one point in the image is easily identified, and a long feature (such as a steel brace or leg bone) is present providing a long region that is easily identified.

In another embodiment, the present invention marks a line on each image. The present invention will match the last point of the first line to the first point of the second line and rotate the images to make the lines parallel. This method is useful when a feature such as a brace or a particular bone is seen partially in one image and partially on the other, with just a minimum of overlap.

Figure 11:
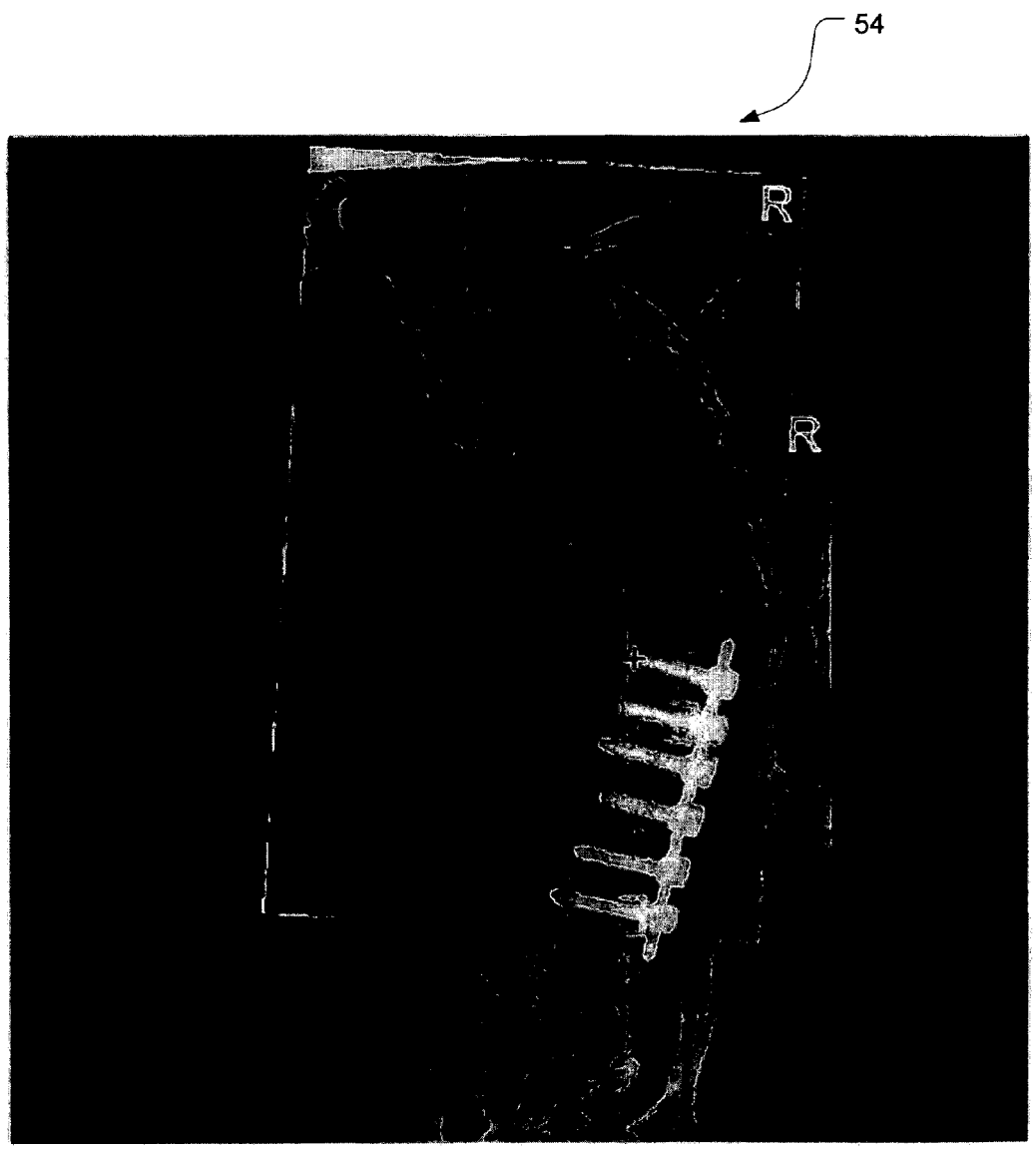
FIG. 11 illustrates a stitched image of the present invention.

After the first image 50 and second image 52 have been superposed and aligned with each other, in some exemplary methods and software of the present invention, the user can blend the overlap section 18 of the images together to improve visualization of the overlap section 18 (FIG. 11). The software of the present invention will typically support a plurality of methods to blend the overlap section of the images. Each of the methods of blending can be used to provide different visual outputs, depending on the desired characteristics of the overlap section. The blended overlap section can be created in a variety of ways. Some methods of creating the blended overlap section include, but are not limited to maximum intensity projection (MIP), minimum intensity projection (MinIP), average, smooth transition, and the like. Depending on the desired effect on the image, in exemplary embodiments the user will be given a choice as to which blending method is used. For example, if the user wants to highlight high-density objects, the user can select a maximum intensity projection. If the user wants to minimize some undesirable high intensity artifacts introduced by the imaging device, the user can select the minimum intensity projection. If the user desires to be aware of relative motion of the subject the user can select an average, which then would show blurring where there was motion. If the user desires a smooth transition between the first and second image, the user can select a blending method which is a weighted average, the weighting changing as a function of position.

In another aspect, the present invention provides a method of blending a first image and a second image. The pixel intensities of the first image and second image are calculated and alignment of the first image with the second image is validated by displaying an absolute difference between the pixel intensities of the first image and the second image in the overlap section. In such methods, the user can visually determine, in real-time, if the first and second images are correctly aligned.

Advantageously, the methods of the present invention provide direct visual feedback in real time regarding the registration between the images in the overlap section. The absolute difference will show how well the pixels of the overlapped images correlate. If there is an exact match, the entire overlap section will be black and the user will know that there was a registration. More likely however, there will be some differences in the images, due to patient movement or the like, between the images. If the images are not correctly aligned, the user can rotate or translate at least one of the images observing and minimizing the differences in the overlap section until the images are accurately aligned in the area of interest, or over the anatomic feature of interest, even if this is not possible over the whole region of overlap.

Figure 24:
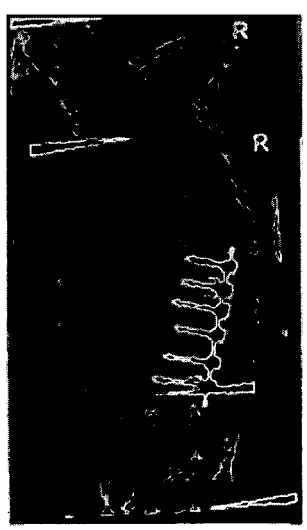
FIG. 24 illustrates a Maximum Intensity Projection Image.
Figure 12:
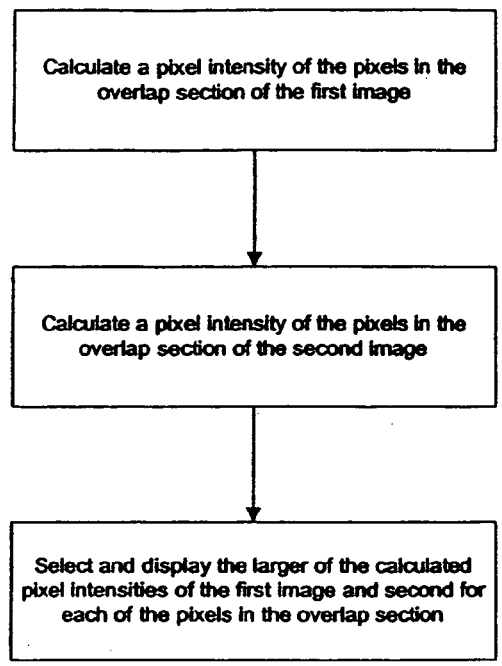
FIG. 12 is a flow chart illustrating a simplified method of blending an overlap section of superposed first and second images using a maximum intensity pixel.

FIG. 12 shows a simplified flow chart of one exemplary blending method that displays a maximum intensity pixel in the overlap section. In such methods, a pixel intensity of all of the pixels in overlap section of the first and second images is calculated on a pixel-by-pixel basis (Steps 100, 102). The pixel that is actually displayed in the overlap section will be the larger of the measured pixel intensity of the overlapping corresponding pixels in the first image and the second image (Step 104). Such a method provides a maximum sharpness and reduces any blurring due to movement of the patient during imaging and highlights high-density objects (FIG. 24).

Figure 25:
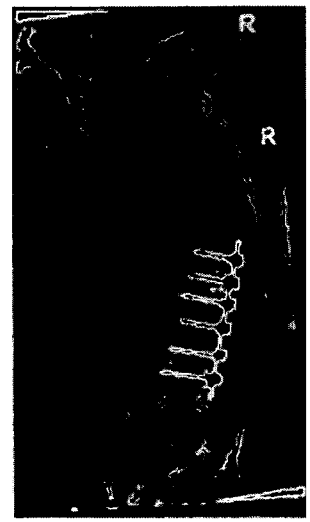
FIG. 25 illustrates a Minimum Intensity Projection Image.
Figure 13:
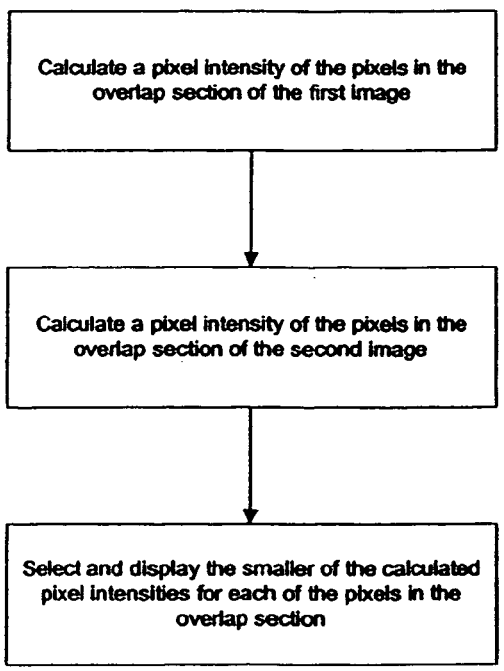
FIG. 13 is a flow chart illustrating another simplified method of blending an overlap section of superposed first and second images using a minimum intensity pixel.

FIG. 13 shows a simplified flow chart of another exemplary blending method that displays a minimum intensity pixel in the overlap section. In such methods, a pixel intensity of all of the pixels in overlap section of the first and second images is calculated on a pixel-by-pixel basis (Steps 106, 108). The pixel that is actually displayed in the overlap section will be the smaller of the measured pixel intensity of the overlapping corresponding pixels in the first image and the second image (Step 110). Such a method provides a minimization of some undesirable high intensity artifacts introduced by the imaging device (FIG. 25).

Figure 14:
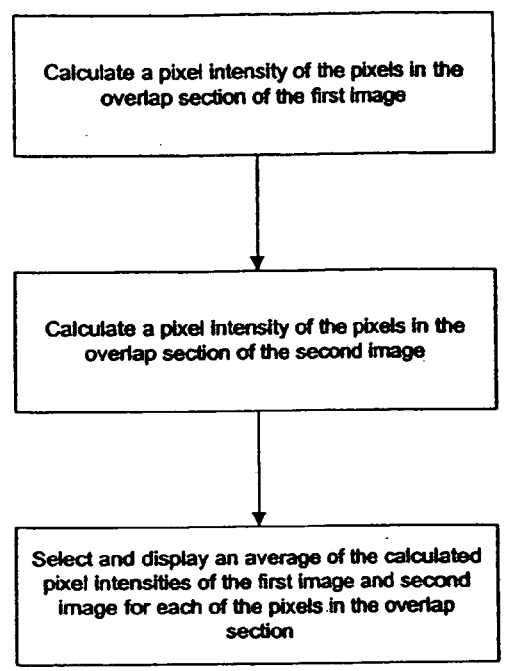
FIG. 14 is a flow chart illustrating yet another simplified method of blending an overlap section of superposed first and second images using an average intensity pixel.

FIG. 14 shows a simplified flow chart of yet another exemplary blending method that displays a pixel having an average intensity value of the pixel intensities from the corresponding pixels in the first and second images. In such methods, a pixel intensity of all of the pixels in overlap section of the first and second images is calculated on a pixel-by-pixel basis (Steps 112, 114). The pixel that is actually displayed in the overlap section will be the average of the measured pixel intensity of the corresponding overlapping pixels in the first image and the second image (Step 116). Such a method provides a means to show blurriness where there was relative motion of the subject.

Figure 15A:
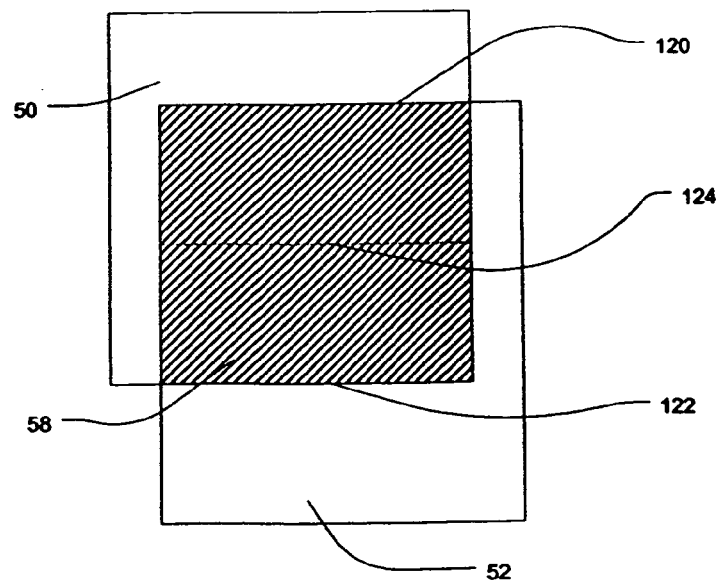
FIG. 15A is a simplified view of an overlap section of the stitched image.
Figure 15B:
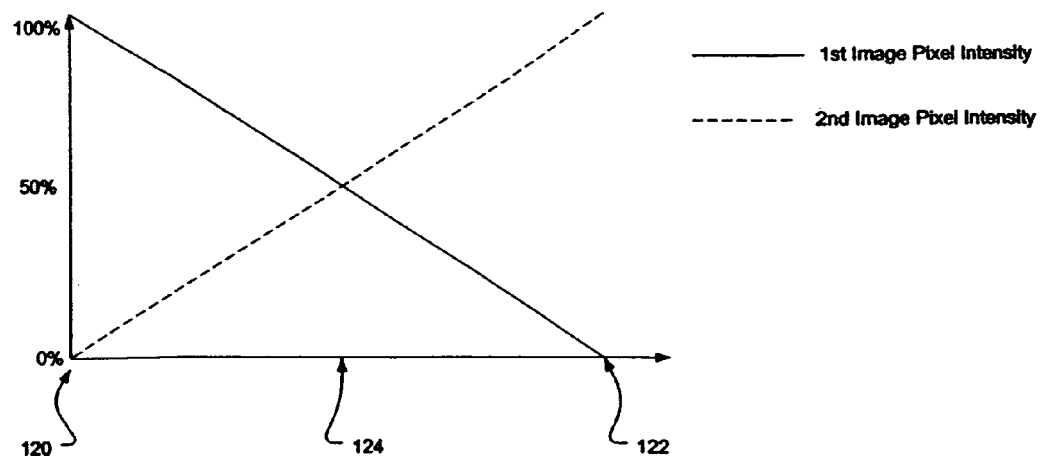
FIG. 15B is a graph illustrating an exemplary linear smooth transition in the overlap section between the first image and second image.
Figure 15C:
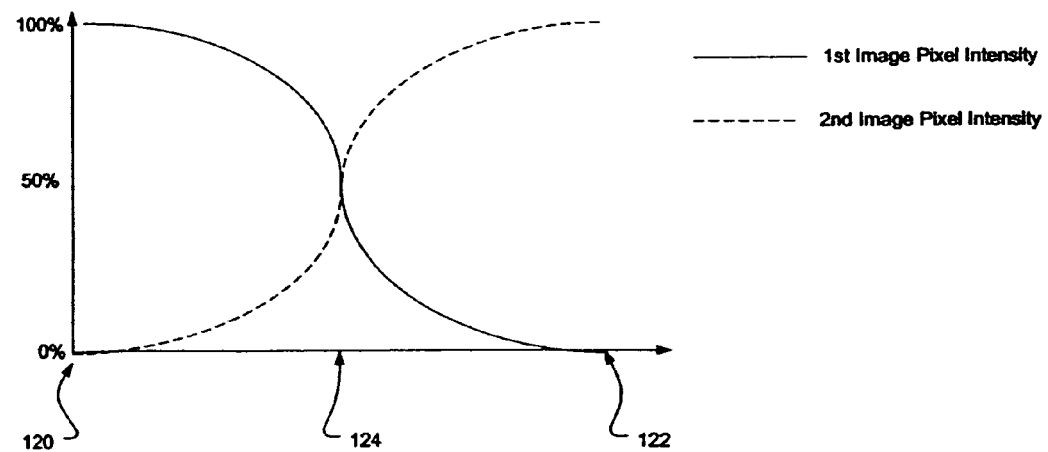
FIG. 15C is a graph illustration an exemplary nonlinear smooth transition overlap section between the first image and second image.

The present invention also provides a method of blending the overlap section in which the overlap section has a smooth transition between the first image and second image. As shown schematically in FIG. 15A, the overlap section 58 has a first border or end 120 that is closer to an upper portion of the first image 50 and a second border or end 122 that is adjacent the lower portion of the second image 52. First border 120 will display a pixel intensity that is 100% from the first image and 0% from the second image. Similarly, second border 122 will have a pixel intensity that is 100% of the second image and 0% of the first image. Typically, the midway point 124 between the first border 120 and the second border 122 will be an average intensity of the first image and second image (e.g., 50% of the first image and 50% of the second image). For simplicity, FIG. 15A shows a first image and a second image that are not rotated. It should be appreciated however, that the blending methods can be used equally well with images that have been rotated In some embodiments, as shown in FIG. 15B, the pixel intensity of the points between the midway point 124 and the first and second borders can have a linear relationship between the pixel intensity of the corresponding pixels of the first image and second image. In other embodiments, as shown in FIG. 15C the pixel intensity of the points between the midway point 124 and the first and second borders can have a non-linear relationship between the pixel intensities of the first image and second image.

Figure 16:
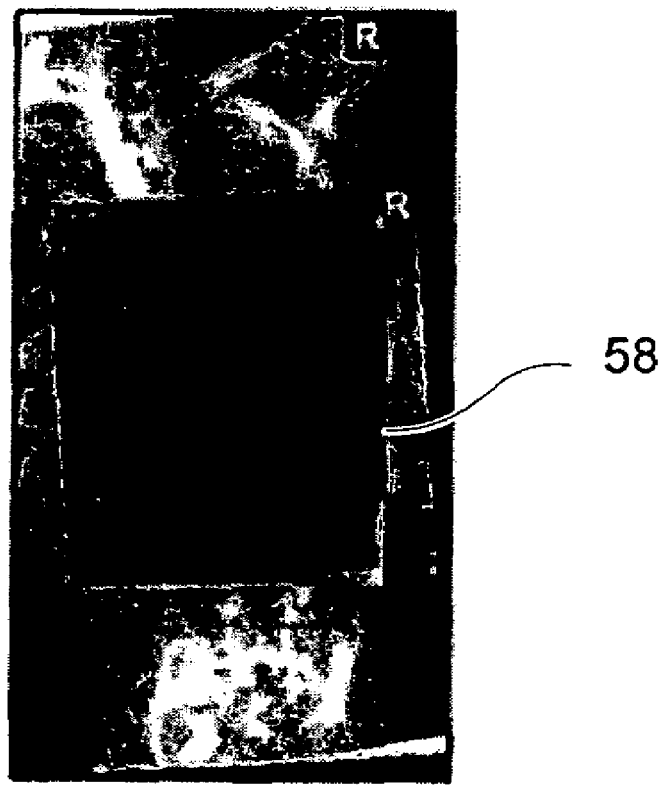
FIG. 16 illustrates an absolute difference validation method for visually indicating mis-registration of the images in the overlap section.

As shown in FIG. 16, the present invention also can provide an "absolute difference" method to validate the registration of the image and to provides direct visual feedback in real-time so as to enhance the visibility of any mis-registration of the images. In the absolute difference method the software will subtract the pixel intensity of the first image from the pixel intensity of the second image, or vice versa. If the first image and second image in the overlap section are perfectly aligned, the user will see only black in the overlap section since the absolute difference will be zero. Generally, however, the user will see some black and non-black pixel intensities in areas that are not perfectly aligned due to rotation or translation of the patient during imaging. Thus, the absolute difference method will be able to provide a real-time visual indication of when the images are substantially aligned. If there is a mis-registration, each image may be rotated or translated until an acceptable match is obtained.

After the first and second images have been aligned and blended using any combination of the above described methods, the resulting composite image can be saved as a separate DICOM image file that can be transferred for analysis by the examining physician.

Figure 17:
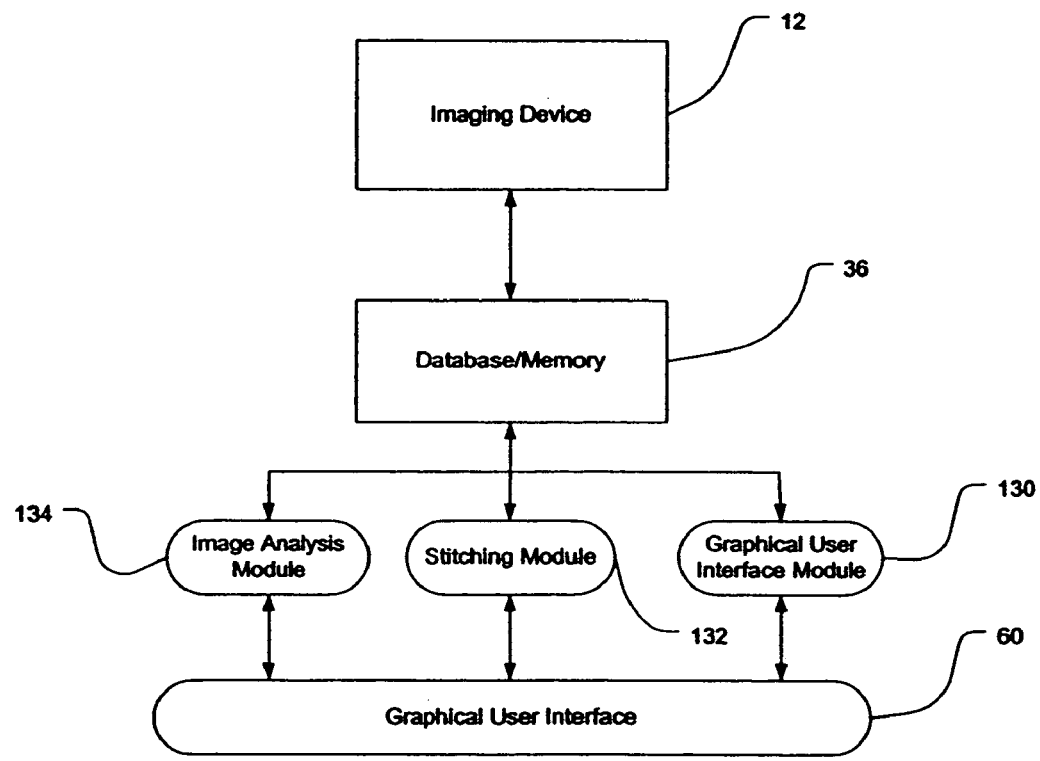
FIG. 17 illustrates software modules of the present invention.

FIG. 17 depicts the software modules according to an embodiment of the present invention. For example, according to an embodiment of the present invention, software modules implementing the functionality of the present invention may be stored in storage subsystem 36 (FIG. 2). These software modules may be executed by processor(s) 50 of computer system 22. In a distributed environment, the software modules may be stored on a plurality of computer systems and executed by processors of the plurality of computer systems.

An exemplary data flow through the software of the present invention will now be described. As shown in FIG. 17, the software of the present invention typically includes a graphical user interface module 130, a stitching module 132, and an image analysis module 134. Image information is obtained with imaging device 12 and stored in memory 36 or other computer readable medium. The software modules can obtain the image data from the computer readable medium and display the selected images on graphic user interface 60. After the first image is displayed on the graphical user interface 60, the user can use the graphical user interface module 130 to zoom in or out of the image by multiplying the slice dimension by a chosen zoom factor and resample the image from the original dataset. Moreover, if the user desires to pan the displayed image, using known methods, the user can use the graphical interface module 130 to cause a 2D transformation of the image by moving the center of the displayed image to a desired point on the graphical user interface.

After a second image is obtained from the computer storage, the first and second images can be marked with a fiducial. The stitching module 132 will typically allow the user to choose which types of marker will be used to mark the images. As described above, in certain imaging situations it may be preferable to use one stitching method (e.g., one point, two points, lines, or the like) over the other markers. The stitching module 132 allows the user to select and place a marker on each of the images. After the markers have been placed on each of the images, at least one of the images can be translated and possibly rotated until the markers are substantially aligned.

Image translation can be performed to the image (x, y) by adding translation amounts to the coordinates of the points. For the new position of image P'(x, y), the following formula can be used to move each point P(x, y) by $d_x$ units parallel to the x axis and by $d_y$ units parallel to the y axis.

$$x'=x+d_x, \ y'=y+d_y$$

Image rotation about a chosen origin, through an angle θ can be performed to the image (x, y) by the following formula.

$$x'=x\cdot\cos\theta-y\cdot\sin\theta, \ y'=x\cdot\sin\theta-y\cdot\cos\theta$$

After the images have been moved and substantially aligned, stitching module 132 can be configured to blend the overlap section of the first and second images to improve visualization of the stitched image. The stitching module 132 can include a variety of blending algorithms so as to allow the user flexibility in choosing how to align and blend the first and second images together.

In a specific embodiment, once the images have been substantially aligned, five blending formulas can be selectively used to calculate the overlap section. For every point P'(x,y) inside the overlapped area, one of the following five blending formulas can be used to produce the new image from two source images, $P_1(x,y)$ and $P_2(x,y)$. It should be appreciated however, that these formulas are merely examples, and other formulas can be used to blend the overlap section.

Average—averaged value between two images.

$$P'(x, y) = \left[\frac{P_1(x, y) + P_2(x, y)}{2}\right]$$

Absolute Difference—absolute difference value between two images.

$$P'(x,y)=|P_1(x,y)-P_2(x,y)|$$

Maximum Intensity Projection—on a pixel-by-pixel basis, selects the densest values from the two images.

$$P'(x, y) = \begin{cases} P_1(x, y), & \text{if } P_1(x, y) \geq P_2(x, y) \\ P_2(x, y), & \text{if } P_2(x, y) > P_1(x, y) \end{cases}$$

MinIP—on a pixel-by-pixel basis, selects the least dense values from the two images.

$$P'(x, y) = \begin{cases} P_1(x, y), & \text{if } P_2(x, y) \geq P_1(x, y) \\ P_2(x, y), & \text{if } P_1(x, y) > P_2(x, y) \end{cases}$$

Blend—smooth transition between two source images
  M=size of overlapped area parallel to the x axis
    $0 \leq i \leq M$
  N=size of overlapped area parallel to the y axis $0 \leq j \leq N$
  In the image space where:
  $P_{1xb}$, $P_{2xb}$=Beginning of the source image 1 and 2 parallel to the x axis
  $P_{1xe}$, $P_{2xe}$=Ending of the source image 1 and 2 parallel to the x axis
  $P_{1yb}$, $P_{2yb}$=Beginning of the source image 1 and 2 parallel to the y axis
  $P_{1ye}$, $P_{2ye}$=Ending of the source image 1 and 2 parallel to the y axis $$d_1 = \min \begin{cases} i - p_{1xb} \\ j - p_{1yb} \\ p_{1xe} - i \\ p_{1ye} - j \end{cases} \quad d_2 = \min \begin{cases} i - p_{2xb} \\ j - p_{2yb} \\ p_{2xe} - i \\ p_{2ye} - j \end{cases}$$

$$W_1 = \frac{d_1}{d_1 + d_2}, \ W_2 = \frac{d_2}{d_1 + d_2}$$

$$P'(i, j) = W_1 P_1(i, j) + W_2 P_2(i, j)$$

After the images have been stitched and blended, the image can be stored and the examining physician can examine the image. As noted above, in scoliosis evaluation, the examining physician needs to measure the angle of the patient's spine (i.e. Cobb's angle). In such uses, the image analysis module 134 can include an algorithm to measure the angle of the patient's spine. In a particular embodiment, the user can draw a line in the disk space between two thoracic vertebrae parallel to the inferior surface of the upper vertebrae and a second line in the disk space between two lumbar vertebrae, parallel to the inferior surface of the upper lumbar vertebrae. The program can then automatically draw a line perpendicular to each of the two user drawn lines and the image analysis module 134 can calculate the angle at the intersection. The measured angle can then be recorded and displayed and used as a reference for treatment recommendation. One specific formula for calculating the angle between two given lines $L_1$ and $L_2$:

$$\theta = \tan^{-1}\left(\frac{L_{1y1} - L_{1y2}}{L_{1x1} - L_{1x2}}\right) - \tan^{-1}\left(\frac{L_{2y1} - L_{2y2}}{L_{2x1} - L_{2x2}}\right)$$

Where:
$L_{1x1}$, $L_{2x1}$=Start point of line 1 and 2 parallel to the x axis
$L_{1x2}$, $L_{2x2}$=End point of line 1 and 2 parallel to the x axis
$L_{1y1}$, $L_{2y1}$=Start point of line 1 and 2 parallel to the y axis
$L_{1y2}$, $L_{2y2}$=End point of line 1 and 2 parallel to the y axis Applicants have found that such an image analysis module has dramatically reduced the errors introduced into the measurement of the angle of the spine (i.e., Cobb angle measurement) such that the introduction of errors into the angle measurement was below 1°. It should be appreciated, that the image analysis module 134 can contain a plurality of algorithms to measure anatomic conditions in the stitched image. For example, in addition to or instead of the line angle measurement algorithm, the image analysis module can include means to measure lengths, distances between anatomic features, and the like.

As illustrated in FIGS. 18–23, the present invention provides graphical user interfaces for manipulating radiographic images. While the following discussion describes one exemplary graphical user interface and methods, it should be appreciated that the present invention can take many different forms that are not described herein, and the present invention is not limited to such an example.

FIG. 4 illustrates an exemplary tool palette of the present invention. The tool palette can include icons to (1) manipulate the image such as zoom, pan, change the window level, inverse color, and (2) tools to stitch the images such as stitch tools and swap images, adjust image. It should be appreciated that other combinations of other conventional icons can be incorporated into the tool palette without departing from the scope of the present invention. All functions available on the tool palette 64 can also be available in a pull down menu of the main menu bar. This redundancy allows the user to employ fewer mouse clicks to reach frequently used commands.

Figure 18:
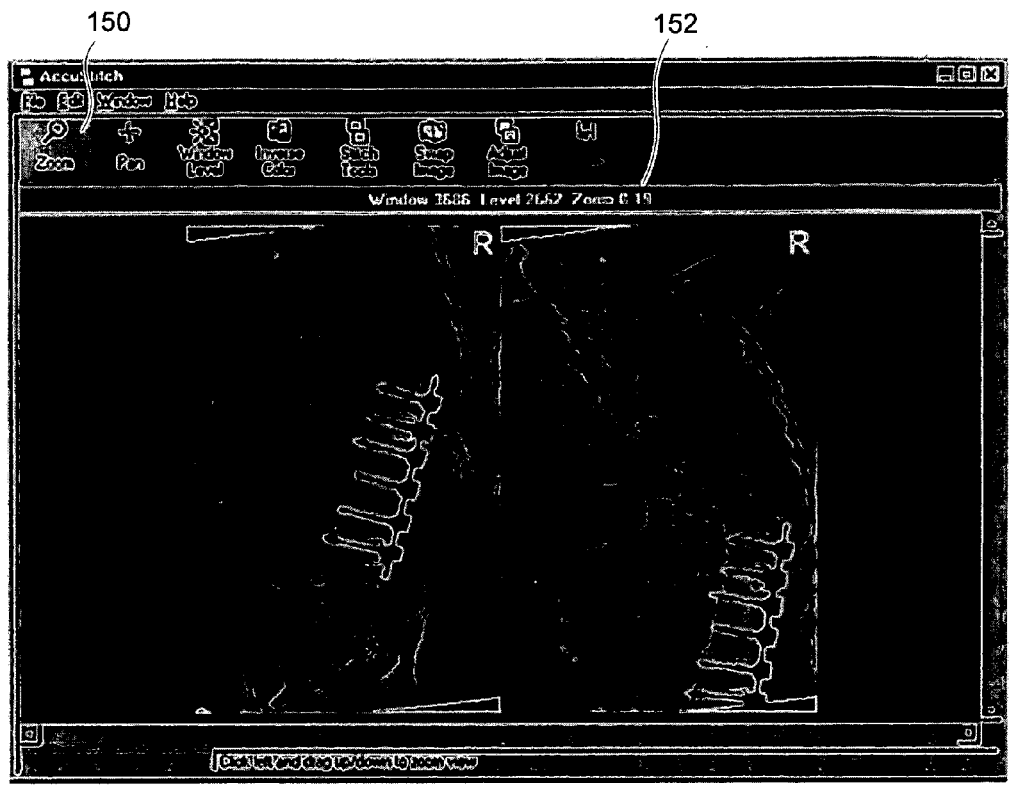
FIG. 18 illustrates a zoom icon of the present invention.

As shown in FIG. 18, selecting the zoom icon 150 will magnify the image in real time. The zoom factor can be changed by clicking on a left mouse button or by depressing selected buttons on a keyboard (typically the up arrow and down arrow). The current zoom factor 151 will typically be displayed on the image window to inform the user of the current zoom factor.

Figure 19:
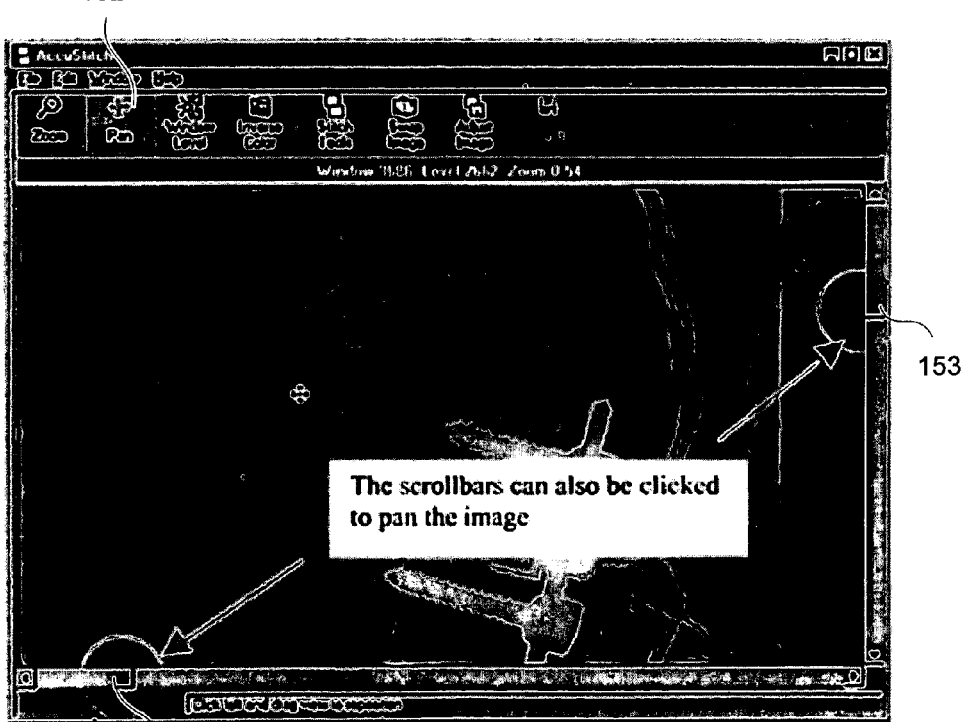
FIG. 19 illustrates a pan icon of the present invention.

As shown in FIG. 19, the user can select the pan icon 152 and pan up, down, left, and right within the image so as to display a desired area. The user can use the mouse and/or click on the scrollbars 153, 153' along the right and bottom of the image window to pan the images. Additionally, the user can select the icon and use the arrow keys on the keyboard to pan through the selected image.

Figure 20:
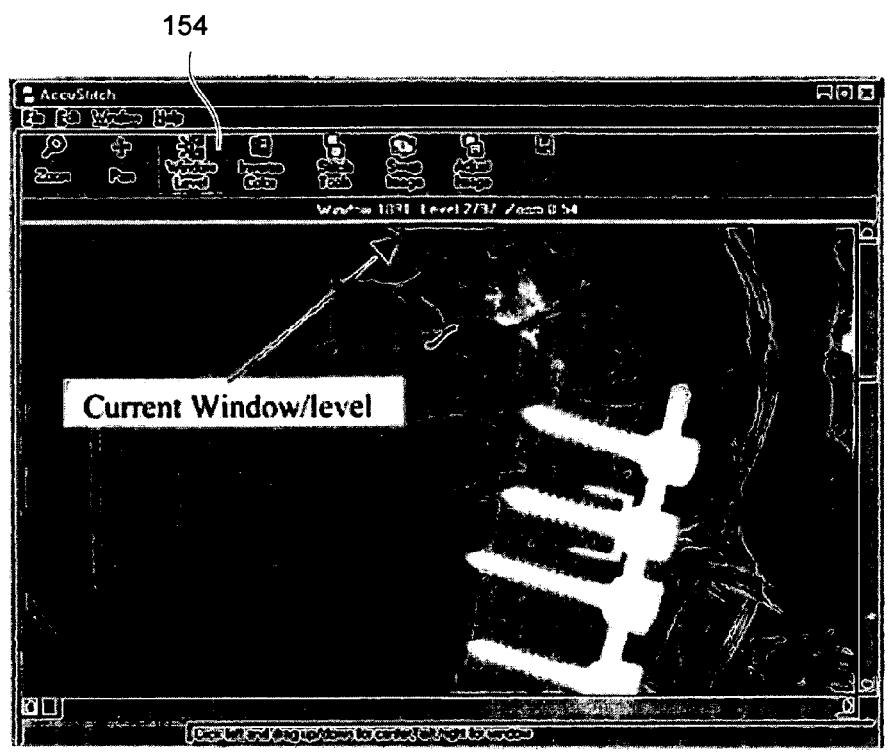
FIG. 20 illustrates a window level icon of the present invention.

Selection of the window level icon 154, as shown in FIG. 20 can be used to change the contrast and brightness of the image. The window level can be displayed on the image window. Adjustment of the window level can be done with the mouse or finely adjusted with the keyboard keys.

Figure 21:
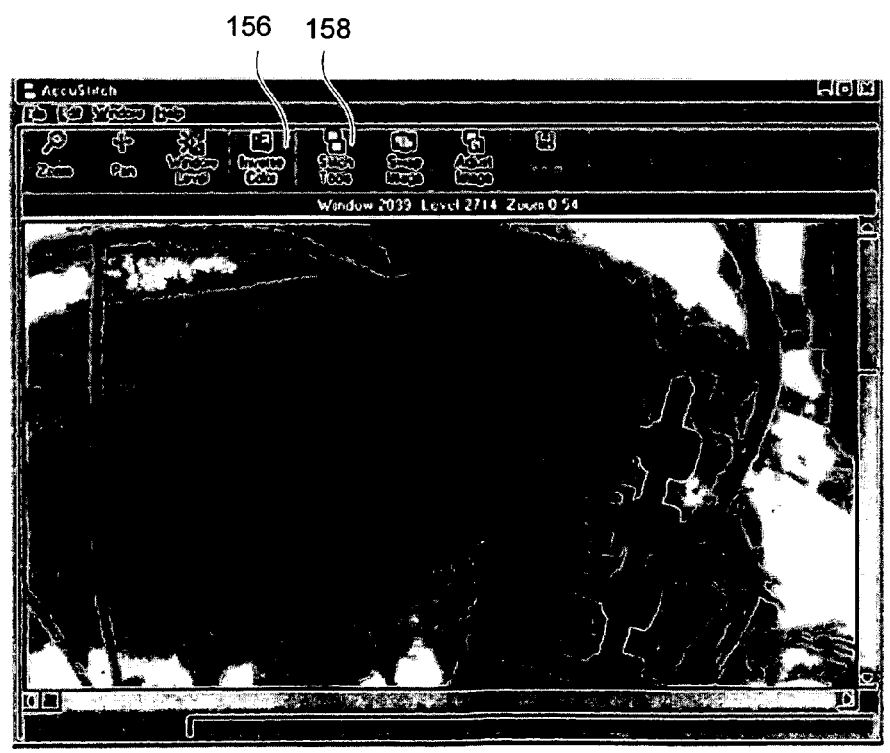
FIG. 21 illustrates an inverse color icon of the present invention.

As shown in FIG. 21, selecting the inverse color icon 156 inverses the color table from black to white, and vice versa. This allows for preferences and conventions in reading images. It is generally recognized that given a certain background intensity, bright features are easier to observe than dark ones, and reversing the scale can aid the operator who may be choosing either dark or bright anatomic landmarks.

Figure 22:
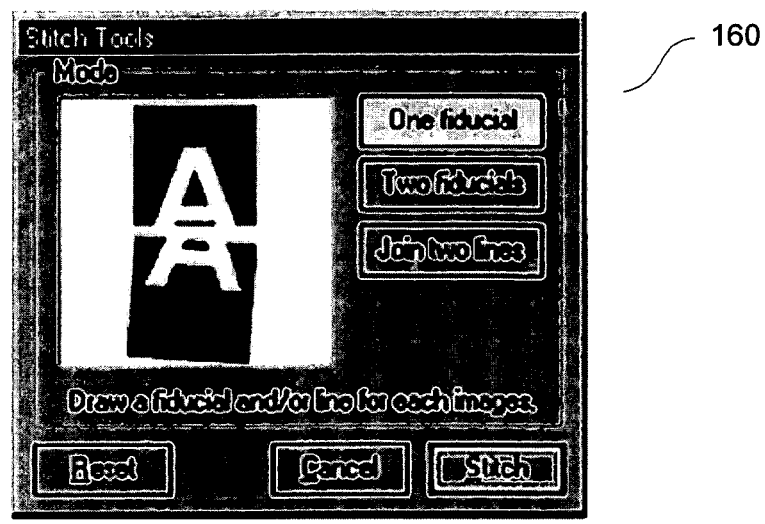
FIG. 22 illustrates a Stitch Tool Dialog Menu of the present invention.

Selecting the Stitch tools icon 158 (FIG. 21) will bring up a Stitch Tool Dialog 160. As shown in FIG. 22, the Stitch Tool Dialog 160, the user can select the type of markers so use to mark the image (e.g., one fiducial, two fiducial, or lines). Selection of the type of marker to use will depend primarily on the anatomic landmarks available in the images. Selecting one of the icons will allow the user to mark the images, as described above in reference to FIGS. 6A–10. After the fiducials have been placed in the appropriate places on the image, the user can actuate the Stitch icon 158 to begin the stitching process.

After the image has been stitched, the user can adjust the position and rotation of the stitched image by activating the Adjust Image icon 162. In exemplary embodiments, the image can be moved one pixel at a time using the keyboard—typically the left, right, up and down keys. To change the rotation, the user can depress the Page Up and Page down keys. If the user depresses the "Shift" key on the keyboard in combination with the other keys, the movement will be increase by a factor of ten. Thus, if the Shift key is held down while depressing the left key, the image will move ten pixels. Similarly, if the Shift key is held down in combination with the Page Down key, the stitched image will rotate ten degrees.

Figure 23:
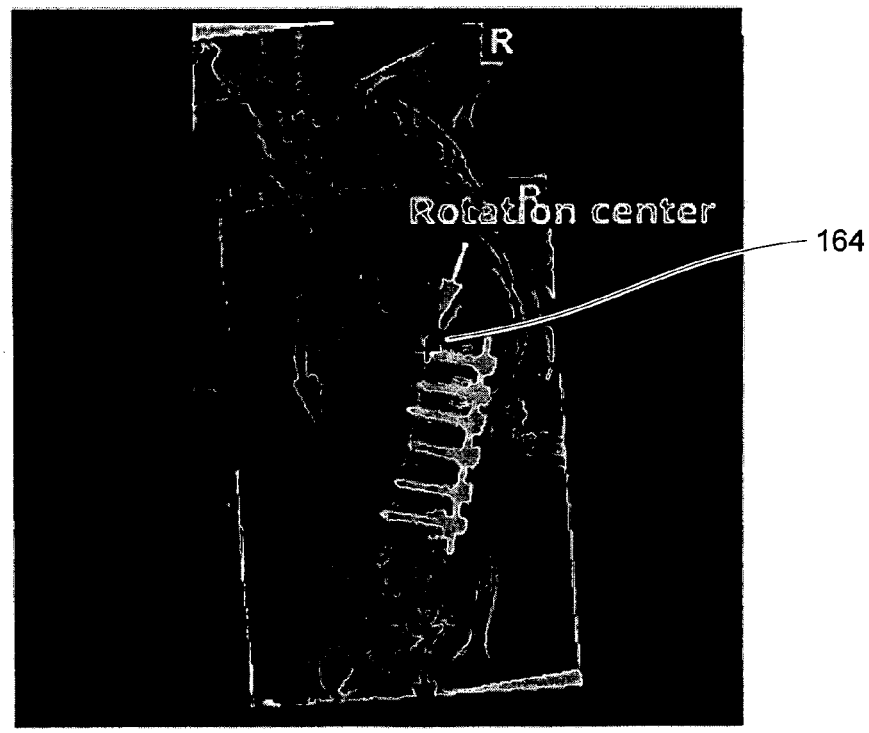
FIG. 23 illustrates changing the center of rotation of the stitched image.

As shown in FIG. 23, to move the center of rotation of the stitched image, a marker 164 in the picture can be moved by clicking and dragging the marker to a new center of rotation. Typically, the marker can be dragged to another position by holding the mouse button down and releasing the button when the cross-mark is at the desired center of rotation.

While the above disclosure as described herein is focused on stitching digitized radiographic images, it should be appreciated that the present invention is equally applicable to CT, MRI, nuclear imaging, ultrasound, aerial and panoramic photography, and other image datasets. Additionally, while the above invention is directed mainly to stitching of medical images, the present invention can be used for editing digital photographs, and the like.

What is claimed is:
1. A method of aligning a plurality of images, the method comprising:
providing a marker on a first image and a second image;
overlapping the first image and the second image to match the marker on the first image with the marker on the second image;
blending an overlap section of the first image and the second image, including providing a smooth transition between the first image and second image by selectively providing from 0% to 100% of the second image; and computing an absolute difference value between the pixel intensities of the overlapping portions of the first and second images to validate alignment between the first and second images.

2. The method of claim 1 comprising realigning at least one of the first image and second image if it is determined that the first and second images are misaligned.

3. The method of claim 1 wherein the first and second images are obtained from a digital radiography device.

4. The method of claim 1 wherein blending comprises:
computing a pixel intensity of the pixels of first image in the overlap section;
computing a pixel intensity of the pixels of the second image in the overlap section that overlap the pixels of the first image in the overlap section; and
displaying for each pixel in the overlap section an average pixel intensity of the overlapping pixels of the first and second images in the overlap section.

5. The method of claim 1 wherein blending comprises providing a smooth transition between the first image and second image by selectively providing from 0% of the first image to 100% of the first image in the overlap section.

6. The method of claim 1 wherein the first and second images comprise a plurality of pixels, each of the pixels having a pixel intensity, wherein in the overlap section a portion of the pixels in the first image overlap a portion of the pixels in the second image, wherein the overlap section comprises a first end and a second end, wherein blending comprises:
displaying 100% of the pixel intensity of the first image at the first end of the overlap section;
displaying 50% of the pixel intensity of the first image with 50% of the pixel intensity of the overlapping pixels of the second image at a halfway point of the overlap section; and
displaying 100% of the pixel intensity of the second image at the second end of the overlap section.

7. The method of claim 6 wherein blending further comprises displaying pixel intensities from the first image and the second image with a weighting for the combination which changes in a non-linear manner from the first end of the overlap section to the second end of the overlap section.

8. The method of claim 6 wherein blending further comprises displaying pixel intensities from the first image and the second image with a weighting for the combination which changes in a linear manner from the first end of the overlap section to the second end of the overlap section.

9. A method of aligning a plurality of images, the method comprising:
providing a marker on a first image and a second image;
overlapping the first image and the second image to match the marker on the first image with the marker on the second image;
blending an overlap section of the first image and the second image; and
computing an absolute difference value between the pixel intensities of the overlapping portions of the first and second images to validate alignment between the first and second images,
the blending comprising:
computing a pixel intensity of the pixels of first image in the overlap section;
computing a pixel intensity of the pixels of the second image in the overlap section that overlap the pixels of the first image in the overlap section; and
displaying for each pixel in the overlap section a largest pixel intensity of the overlapping pixels from the first image and second image.

10. A method of aligning a plurality of images, the method comprising:
providing a marker on a first image and a second image;
overlapping the first image and the second image to match the marker on the first image with the marker on the second image;
blending an overlap section of the first image and the second image; and
computing an absolute difference value between the pixel intensities of the overlapping portions of the first and second images to validate alignment between the first and second images,
the blending comprising:
computing a pixel intensity of the pixels of first image in the overlap section;
computing a pixel intensity of the pixels of the second image in the overlap section that overlap the pixels of the first image in the overlap section; and
displaying for each pixel in the overlap section a smallest computed pixel intensity from the overlapping pixels from the first image and second image.

11. A method of stitching a plurality of images, the method comprising:
providing a marker on a first image and a second image;
overlapping the first image and the second image to create an overlap section, wherein overlapping matches the marker on the first image with the marker on the second image;
calculating an absolute difference between the pixel intensity values of the overlapping portions of the first and second images in the overlap section so as to validate alignment between the first and second images;
blending the overlap section of the first image and the second image; and
adjusting a position of at least one of the first or second images by a plurality of fixed steps.

12. The method of claim 11 wherein the first and second images are obtained from a digital radiography device.

13. The method of claim 11 wherein blending comprises:
computing a pixel intensity of the pixels of first image in the overlap section;
computing a pixel intensity of the pixels of the second image in the overlap section that overlap the pixels of the first image in the overlap section; and
displaying for each pixel in the overlap section an average pixel intensity of the overlapping pixels of the first and second images in the overlap section.

14. The method of claim 11 wherein blending comprises providing a smooth transition between the first image and second image by selectively providing from 0% of the first image to 100% of the first image in the overlap section.

15. The method of claim 11 wherein blending comprises providing a smooth transition between the first image and second image by selectively providing from 0% to 100% of the second image.

16. The method of claim 11 wherein the first and second images comprise a plurality of pixels, each of the pixels having a pixel intensity, wherein in the overlap section a portion of the pixels in the first image overlap a portion of the pixels in the second image, wherein the overlap section comprises a first end and a second end, wherein blending comprises:
   displaying 100% of the pixel intensity of the first image at the first end of the overlap section;
   displaying 50% of the pixel intensity of the first image with 50% of the pixel intensity of the overlapping pixels of the second image at a halfway point of the overlap section; and
   displaying 100% of the pixel intensity of the second image at the second end of the overlap section.

17. The method of claim 16 wherein blending further comprises displaying pixel intensities from the first image and the second image with a weighting for the combination which changes in a non-linear manner from the first end of the overlap section to the second end of the overlap section.

18. The method of claim 16 wherein blending further comprises displaying pixel intensities from the first image and the second image with a weighting for the combination which changes in a linear manner from the first end of the overlap section to the second end of the overlap section.

19. The method of claim 11 wherein the overlap section is black when the overlapping pixels of the first image and the second image have the same pixel intensity.

20. The method of claim 19 wherein calculating is in real-time.

21. The method of claim 11 wherein providing a marker comprises marking a first point on the first image and a second point on the second image, and wherein overlapping comprises matching the first and second points and keeping the orientation of the first and second image fixed.

22. The method of claim 11 wherein providing a marker comprises marking a first point and a first line on the first image and a second point and second line on the second image, wherein superimposing comprises:
   matching the first points and second points; and
   rotating one of the first and second images so that the first line and second line are parallel.

23. The method of claim 11 wherein providing a marker comprises marking a first line on the first image and a second line on the second image so that a last point of the first line and a first point of the second line are matched and wherein overlapping comprises rotating at least one of the images so as to make the first line and second line parallel.

24. The method of claim 11 wherein the fixed step comprises a one pixel displacement.

25. The method of claim 11 wherein the fixed steps comprise a 10 pixel displacement.

26. The method of claim 11 wherein adjusting of the position of the image(s) is made in a fixed step by the use of a keyboard key or combination of keys.

27. The method of claim 11 wherein the first image is rotated in a plurality of fixed steps by the use of a keyboard key.

28. The method of claim 27 wherein the steps comprise a one quarter degree rotation.

29. The method of claim 27 wherein the fixed step comprises a one degree rotation.

30. The method of claim 27 wherein the fixed step comprises a ten degree rotation.

31. The method of claim 11 comprising tracking the position of the moved image in real time.

32. The method of claim 11 comprising adjusting a center of rotation of at least one of the first and second image.

33. The method of claim 32 wherein adjusting comprises clicking and dragging a cursor over a selected image.

34. A method of stitching a plurality of images, the method comprising:
   providing a marker on a first image and a second image;
   overlapping the first image and the second image to create an overlap section, wherein overlapping matches the marker on the first image with the marker on the second image;
   calculating an absolute difference between the pixel intensity values of the overlapping portions of the first and second images in the overlap section so as to validate alignment between the first and second images; and
   blending the overlap section of the first image and the second image, including:
      computing a pixel intensity of the pixels of first image in the overlap section;
      computing a pixel intensity of the pixels of the second image in the overlap section that overlap the pixels of the first image in the overlap section; and
      displaying for each pixel in the overlap section a largest pixel intensity of the overlapping pixels from the first image and second image.

35. A method of stitching a plurality of images, the method comprising:
   providing a marker on a first image and a second image;
   overlapping the first image and the second image to create an overlap section, wherein overlapping matches the marker on the first image with the marker on the second image;
   calculating an absolute difference between the pixel intensity values of the overlapping portions of the first and second images in the overlap section so as to validate alignment between the first and second images; and
   blending the overlap section of the first image and the second image, including:
      computing a pixel intensity of the pixels of first image in the overlap section;
      computing a pixel intensity of the pixels of the second image in the overlap section that overlap the pixels of the first image in the overlap section; and
      displaying for each pixel in the overlap section a smallest computed pixel intensity from the overlapping pixels from the first image and second image.

36. A method of stitching a plurality of images, the method comprising:
   providing a first image and a second image;
   allowing a user to choose one of at least two of the following methods of marking:
      marking a first point on the first image and a second point on the second image;
      marking a first and second point on the first image and a third and fourth point on the second image;
      marking a first point and a first line on the first image and a second point and second line on the second image;
      marking a first line on the first image and a second line on the second image;
   marking the first image and second image with a chosen marker; and
   aligning the markers to stitch the first and second images together.

37. The method of claim 36 wherein marking comprises placing the first point on the first image and the second point on the second image, wherein aligning further comprises keeping the orientation of the first and second image fixed.

38. The method of claim 36 wherein marking comprises placing the first point and the first line on the first image and the second point and second line on the second image, wherein aligning comprises matching the first points and second points and rotating one of the first and second images so that the first line and second line are parallel.

39. The method of claim 36 wherein marking comprises placing the first point and second point on the first image and the third point and fourth point on the second image, wherein aligning comprises matching the first point with the third point and rotating one of the first image and second image until the second point and fourth points are matched.

40. The method of claim 36 wherein marking comprises placing the first line on the first image and the second line on the second image, wherein aligning comprises overlapping the first line and second line so that a last point of the first line and a first point of the second line are matched, wherein at least one of the first and second images are rotated so as to make the first line and second line parallel.

41. A method of measuring an angle of scoliosis, the method comprising:
   providing a first radiographic image of at least a portion of the thoracic and upper lumbar spine;
   providing a second radiographic image of at least a portion of the lumbar and lower thoracic spine;
   stitching the first radiographic image to the second radiographic image; and
   measuring an angle of scoliosis on the stitched radiographic image.

42. The method of claim 41 wherein measuring comprises placing two lines on the radiographic image and measuring the angle between the two lines.

43. The method of claim 41 wherein measuring comprises:
   drawing a line in a disk space between two thoracic vertebrae parallel to an inferior surface of an upper vertebrae;
   drawing a second line in a disk space between two lumbar vertebrae, parallel to the inferior surface of an upper lumbar vertebrae;
   drawing a line perpendicular to each of the first and second lines such that the lines intersect; and
   calculating the angle at an intersection.

44. The method of claim 41 comprising blending an overlap section of the first radiographic image and the second radiographic image.

45. The method of claim 44 comprising validating a registration of the first image and second image by displaying an absolute difference between the first image and second image in the overlap section.

46. A method of stitching a first image and a second image, the method comprising:
   providing at least a first marker on a first image and at least a second marker on the second image, wherein the first image and second image comprise a plurality of pixels;
   matching the first and second markers, wherein matching overlaps a portion of the first image and a portion of the second image; and
   selecting a desired blending method from a plurality of blending methods; and
   using the selected blending method to blend the overlapping portions of the first image and second image.

* * * * *